US011737077B2

(12) United States Patent
Mizutani et al.

(10) Patent No.: US 11,737,077 B2
(45) Date of Patent: Aug. 22, 2023

(54) TRANSMISSION DEVICE AND TRANSMISSION METHOD

(71) Applicant: KYOTO UNIVERSITY, Kyoto (JP)

(72) Inventors: Keiichi Mizutani, Kyoto (JP); Hiroshi Harada, Kyoto (JP); Takeshi Matsumura, Kyoto (JP); Yuji Mizutani, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 51 days.

(21) Appl. No.: 17/290,885

(22) PCT Filed: Nov. 11, 2019

(86) PCT No.: PCT/JP2019/044063
§ 371 (c)(1),
(2) Date: May 3, 2021

(87) PCT Pub. No.: WO2020/105481
PCT Pub. Date: May 28, 2020

(65) Prior Publication Data
US 2022/0007381 A1 Jan. 6, 2022

(30) Foreign Application Priority Data
Nov. 22, 2018 (JP) .................. 2018-219641

(51) Int. Cl.
*H04W 72/12* (2023.01)
*H04L 27/26* (2006.01)

(52) U.S. Cl.
CPC ............. *H04W 72/12* (2013.01); *H04L 27/26* (2013.01)

(58) Field of Classification Search
CPC .... H04W 72/12; H04L 27/26; H04L 27/2605; H04L 27/2636; H04L 27/264; H04L 27/26265; Y02D 30/70; H04B 1/04
See application file for complete search history.

(56) References Cited

U.S. PATENT DOCUMENTS

| 6,411,662 B1* | 6/2002 | Sakoda ................. H04W 88/02 370/330 |
| 7,558,238 B1* | 7/2009 | Sun ...................... H04W 74/02 370/335 |
| 2002/0034950 A1* | 3/2002 | Sawada ................. H04W 16/32 455/562.1 |

(Continued)

FOREIGN PATENT DOCUMENTS

| JP | 2015-207834 A | 11/2015 |
| JP | 2016-513402 A | 5/2016 |
| JP | 2017-123604 A | 7/2017 |

OTHER PUBLICATIONS

International Search Report dated Dec. 24, 2019 in PCT/JP2019/044063 filed Nov. 11, 2019, 2 pages.

(Continued)

*Primary Examiner* — Abdullahi Ahmed
(74) *Attorney, Agent, or Firm* — Oblon, McClelland, Maier & Neustadt, L.L.P.

(57) ABSTRACT

A transmission device including a time-domain windowing processing circuit to which a transmission symbol is input and in which the transmission symbol is multiplied by a time window. As the time window, a result of pre-convolving an arbitrary filter into an arbitrary time window is used.

14 Claims, 19 Drawing Sheets

(56) References Cited

U.S. PATENT DOCUMENTS

| | | | | |
|---|---|---|---|---|
| 2002/0118659 A1* | 8/2002 | Sakoda | ............... | H04B 7/264 370/329 |
| 2003/0007467 A1* | 1/2003 | Sawada | ............... | H04W 16/00 370/329 |
| 2003/0144005 A1* | 7/2003 | Videtich | ............... | H04W 4/02 455/435.1 |
| 2004/0142696 A1* | 7/2004 | Saunders | ............... | H04W 16/14 455/450 |
| 2005/0185629 A1* | 8/2005 | Kuroda | ............... | H04L 69/08 370/347 |
| 2009/0168811 A1* | 7/2009 | Seyama | ............... | H04L 1/0026 370/537 |
| 2011/0069774 A1* | 3/2011 | Wang | ............... | H04W 52/248 375/267 |
| 2011/0130108 A1* | 6/2011 | Katayama | ............... | H04L 7/042 455/226.1 |
| 2014/0233664 A1 | 8/2014 | Abdoli et al. | | |
| 2015/0312080 A1 | 10/2015 | Abdoli et al. | | |
| 2016/0254897 A1* | 9/2016 | Berretta | ............... | H04W 72/0446 375/267 |
| 2019/0013890 A1 | 1/2019 | Mizutani et al. | | |

OTHER PUBLICATIONS

Qualcomm Incorporated, "Filter complexity analysis and trade-offs", 3GPP TSG-RAN WG4#82BIs, R4-1703267, 2017, 5 total pages.

Mizutani, Y., et al., "A low Pass Filtered-Raised-Cosine Window for UTW-DFTs-OFDM", The 21st International Symposium on Wireless Personal Multimedia Communications (WPMC-2018), pp. 641-646, 7 total pages.

* cited by examiner (a) CP and CS added DFTs-OFDM symbol (b) Universal Time-domain Window (c) UTW-DFTs-OFDM Symbol (a) Rectangular Time-domain Window (b) Time response of LPF for eUF-DFTs-OFDM (c) Proposed Time-domain Window for UTW-DFTs-OFDM (b) 16QAM (c) 64QAM (a) At channel-edge (b) At 2.65 MHz offset from center frequency

TRANSMISSION DEVICE AND TRANSMISSION METHOD

TECHNICAL FIELD

The present invention relates to a transmission device and a transmission method that can be used, for example, not only in existing mobile communication systems but also in the 5th generation mobile communication systems and subsequent next-generation systems.

TECHNICAL BACKGROUND

In a mobile phone system such as a wireless LAN or an LTE (Long term evolution) network, an orthogonal frequency division multiplexing (OFDM) scheme, or a DFTs-OFDM scheme, which is a single carrier transmission scheme that has the same spectral properties as OFDM by adding spread processing by discrete Fourier transform (DFT), is adopted. The OFDM scheme and the DFTs-OFDM scheme are each a multi-carrier scheme in which multiple subcarriers are bundled and transmitted, and have contributed to increasing transmission rates of wireless communication systems.

However, in the OFDM scheme and the DFTs-OFDM scheme, emission outside an allocated band (hereinafter referred to as OOBE (out-of-band emission) as appropriate) is high, and the OOBE interferes with neighboring systems. Therefore, a method for effectively suppressing OOBE has been sought. A cause for occurrence of OOBE in OFDM and DFTs-OFDM is discontinuity between symbols. One way to suppress OOBE is to convolve a bandwidth-limiting filter on a time-domain, and schemes such as Filtered-OFDM (F-OFDM) and (Universal Filtered-OFDM (UF-OFDM)) have been proposed.

On the other hand, as methods for suppressing OOBE by smoothing discontinuity between symbols with a time window, a universal time-domain windowed OFDM scheme (UTW-OFDM) (see Patent Document 1), a windowed OFDM (W-OFDM), and the like have been proposed. By increasing a window transition length, a sufficiently large OOBE suppression effect is expected.

RELATED ART

Patent Document

Patent Document 1: Japanese Patent Application Laid-Open Publication No. 2017-123604.

SUMMARY OF THE INVENTION

Problems to be Solved by the Invention

However, a method in which strict bandwidth limitation by a filter is performed requires a large filter tap coefficient, and there is a problem that increasing the number of multipliers involved in convolution processing on a time-domain leads to an increase in the scale of a mounted circuit or in the amount of calculation. Further, for a method in which OOBE is suppressed by smoothing discontinuity between symbols with a time window, there is a problem that communication quality deteriorates when a window transition length is too long.

Therefore, the present invention is intended to provide a transmission device and a transmission method that are characterized by a new method for generating a window function for solving both the implementation complexity problem of the filter-based OOBE suppression method and the communication quality deterioration problem of the time window-based OOBE suppression method.

Means for Solving the Problems

The present invention provides a transmission device that includes a time-domain windowing processing circuit to which a transmission symbol is input and in which the transmission symbol is multiplied by a time window. As the time window, a result of pre-convolving an arbitrary filter into an arbitrary time window is used.

Further, the present invention provides a transmission method that includes time-domain windowing processing in which a transmission symbol is input and the transmission symbol is multiplied by a time window. As the time window, a result of pre-convolving an arbitrary filter into an arbitrary time window is used.

Effect of Invention

According to the present invention, a larger OOBE suppression effect can be obtained with a small circuit scale and the same window transition length. Therefore, the window transition length required to obtain the same OOBE suppression effect can be shortened, and thus, the communication quality can be improved. The effects described herein are not necessarily limited, and may be any effect described in the present invention. Further, the content of the present invention is not to be interpreted in a limited manner by the effects exemplified in the following description.

MODE FOR CARRYING OUT THE INVENTION

In the following, an embodiment of the present invention is described. An embodiment to be described below is a preferred embodiment of the present invention and has various technically preferable limitations. However, the scope of the present invention is not to be limited to these embodiments unless specifically stated in the following description that the present invention is to be limited.

Figure 1:
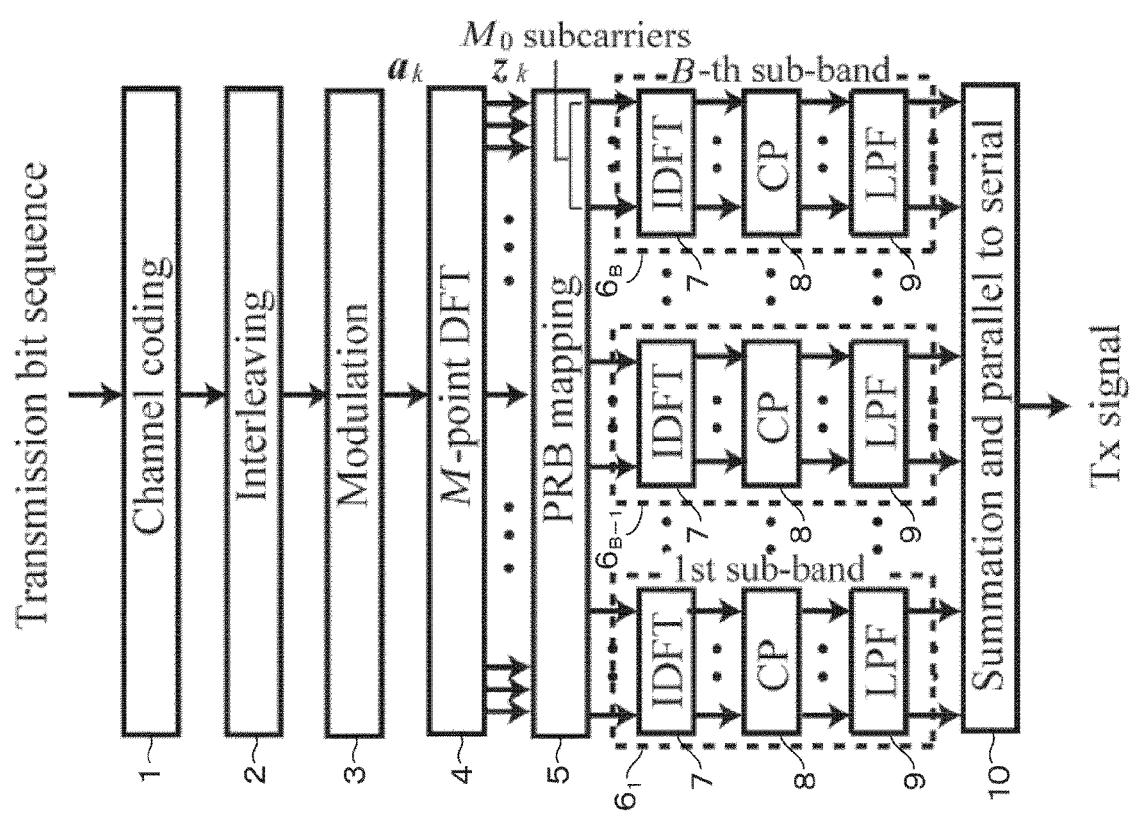
FIG. 1 is a block diagram illustrating a structure of a eUF-DFTs-OFDM transmitter.

First, as a comparative example of the present invention, another modulation scheme (eUF-DFTs-OFDM (enhanced Universal Filtered-DFTs-OFDM)) is schematically described. FIG. 1 illustrates a structure a eUF-DFTs-OFDM transmitter. eUF-DFTs-OFDM is a scheme in which a CP insertion process is added to UF-DFTs-OFDM. A transmission bit sequence is supplied to a channel encoder 1 and is channel encoded. An output of the channel encoder 1 is supplied to an interleave circuit 2 and is interleaved. An output of the interleave circuit 2 is supplied to a modulator 3 and is modulated into a complex signal. A channel encoding scheme and an encoding rate thereof, an appropriate interleaving scheme, and an appropriate primary modulation scheme are selected according to resource control information (an encoding parameter, an interleaving parameter, and a modulation parameter) of a physical layer scheduler (not illustrated in the drawings).

An output of the modulator 3 is supplied to an M-point DFT circuit 4 and is subjected to DFT processing. M represents the number of modulation symbols included in one DFTs-OFDM symbol. An output of the M-point DFT circuit 4 is supplied to a PRB (physical resource block) mapping circuit 5. Subcarriers are divided into B sub-bands after processing by the PRB mapping circuit 5. $M_o$ subcarriers are included for each sub-band. The relation ($B=M/M_o$) holds.

Transmission processing parts ($6_1, \ldots, 6_{B-1}, 6_B$) that respectively correspond to the sub-bands each include an IDFT circuit 7, a CP (Cyclic Prefix) addition circuit 8 and a low-pass filter (LPF) 9. Conversion to a time-domain waveform is performed by the IDFT circuit 7. CP is redundant data for absorbing influence of a propagation delay received by an output of the IDFT circuit 7. Outputs of the transmission processing parts ($6_1, \ldots, 6_{B-1}, 6_B$) are summed and the result is supplied to a parallel-to-serial conversion circuit 10, and thereby, a transmission signal (Tx) is formed.

Processing in a time domain of each sub-band is described with reference to FIG. 2. FIG. 2(a) illustrates a symbol of the M-th sub-band of CP-based discrete Fourier transform (DFT)-spread OFDM (CP-DFTs-OFDM). CP has a length of $L_{CP}'$. $L_{CP}'=L_{CP}-(L_F-1)$. $L_{CP}$ and $L_F$ are respectively a CP length in the existing CP-DFTs-OFDM and an LPF time response length (see FIG. 2 (b)).

Figure 2:
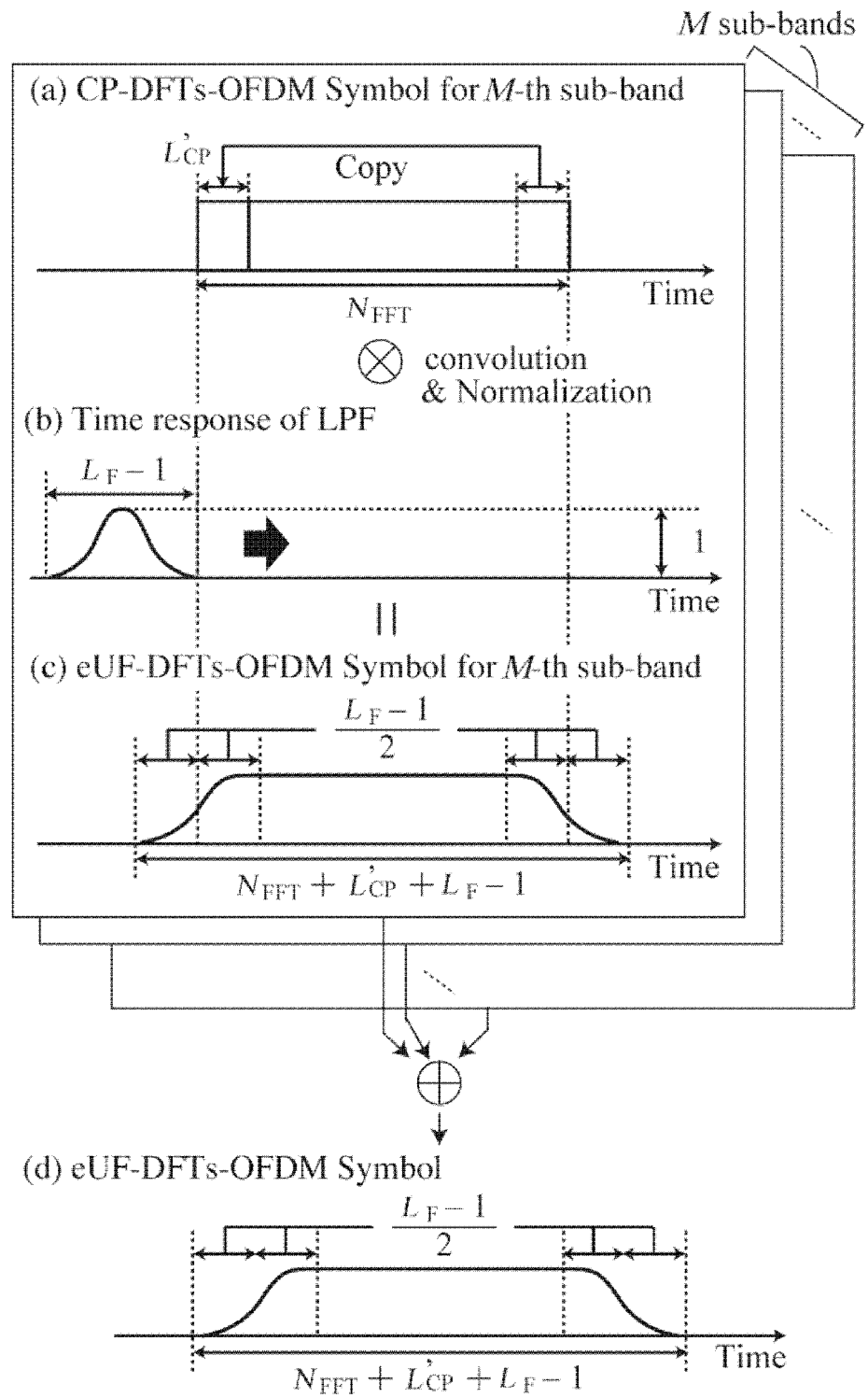
FIG. 2 is a schematic diagram for describing processing in a time domain of each sub-band.

CP-DFTs-OFDM symbol illustrated in FIG. 2(a) is subjected to convolution operation processing based on an LPF time response illustrated in FIG. 2(b) and is normalized. Then, a eUF-DFTs-OFDM symbol of the M-th sub-band illustrated in FIG. 2 (c) is generated. The eUF-DFTs-OFDM symbols of all the sub-bands are summed to form a eUF-DFTs-OFDM symbol illustrated in FIG. 2(d).

On the receiving side, after the time-domain processing, a time-domain reception signal is subjected to $N_{FFT}$-point FFT processing. After channel equalization, a frequency-domain reception signal is obtained by reverse processing of the transmitter processing. In the above-described eUF-DFTs-OFDM, since the LPF processing in each sub-band needs to perform a convolution operation, there is a problem that the scale of a circuit for signal processing becomes large. The same problem occurs in similar schemes such as UF-DFTs-OFDM, UF-OFDM and eUF-OFDM.

Figure 3:
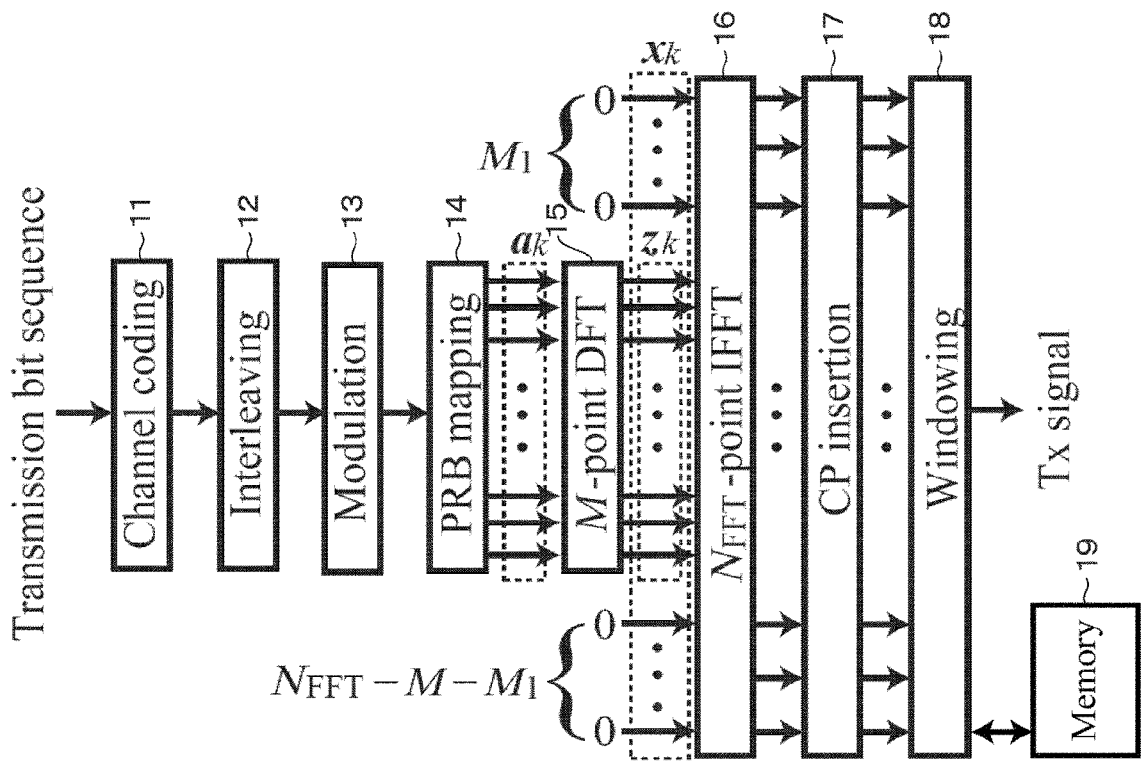
FIG. 3 is a block diagram illustrating a structure of a transmitter of an embodiment of the present invention.

Next, an embodiment of the present invention is described. The embodiment is an embodiment in which the present invention is applied to a Universal Time-domain Windowed-DFT-spread OFDM (UTW-DFTs-OFDM) scheme. FIG. 3 illustrates a structure of a transmitter of the embodiment of the present invention. A transmission bit sequence is supplied to a channel encoder 11 and is channel encoded. An output of the channel encoder 11 is supplied to an interleave circuit 12 and is interleaved. An output of the interleave circuit 12 is supplied to a modulator 13 and is modulated into a complex signal.

An output of the modulator 13 is supplied to a PRB (physical resource block) mapping circuit 14. A symbol from the PRB mapping circuit 14 is supplied to an M-point DFT circuit 15. A transmission symbol in which $M_1$ and $M_2$ 0 symbols are added to an output of the M-point DFT circuit 15 is supplied to an $N_{FFT}$-point IFFT circuit 16. An output of the $N_{FFT}$-point IFFT circuit 16 is supplied to a CP (Cyclic Prefix) insertion circuit 17 for absorbing an effect of a propagation delay.

An output of the CP insertion circuit 17 is subjected to time-domain windowing processing in a time-domain windowing processing circuit 18, and a UTW-DFTs-OFDM transmission symbol is generated. By multiplying a time window function (Universal Time-domain Window; UTW) (to be described later), out-of-band emission is suppressed. A memory 19 is provided in association with the time-domain windowing processing circuit 18.

A look-up table for time-domain windowing processing is stored in the memory 19, and a coefficient used in time-domain windowing processing is defined by the look-up table. A type or a window transition length of a time window can be arbitrarily set for each channel, and the time window can be multiplied by an arbitrary normalization coefficient such that transmission power control in a baseband is enabled. Further, the type and the transition length of the time window and the normalization coefficient may be controlled by a control device such as a physical layer scheduler.

Figure 4:
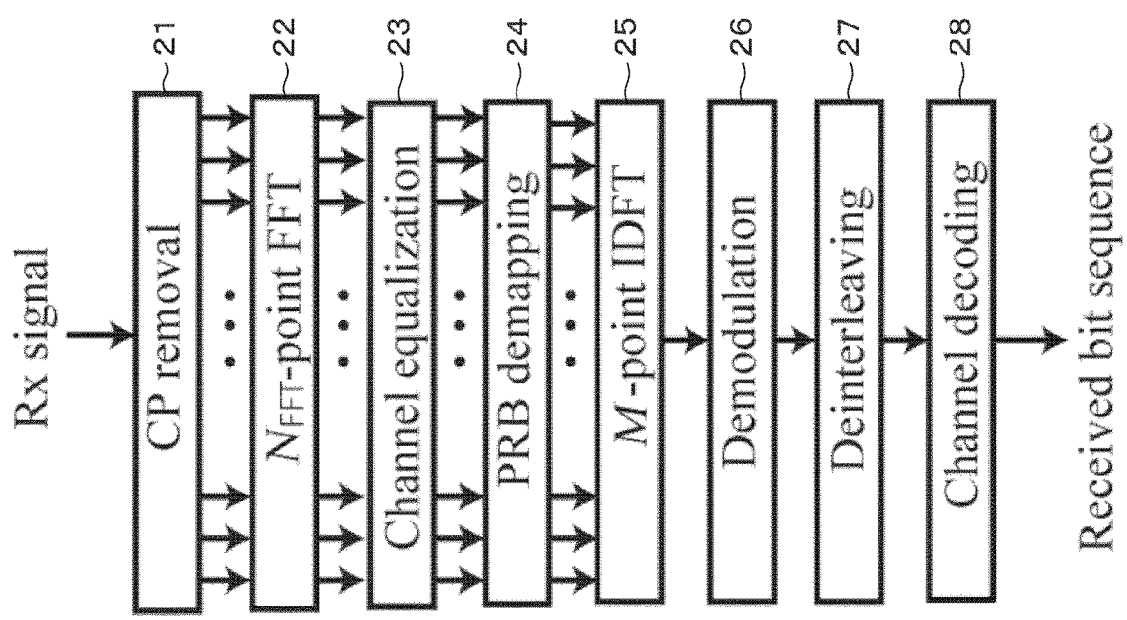
FIG. 4 is a block diagram illustrating a structure of a receiver of the embodiment of the present invention.

As illustrated in FIG. 4, in a receiver, first, a UTW-DFTs-OFDM reception signal is supplied to a CP removal circuit 21, and, after CP removal, an $N_{FFT}$-point FFT circuit 22 performs FFT processing with respect to a reception data symbol vector. Next, an element corresponding to an allocated band is extracted, and channel equalization by a channel equalization circuit 23 is performed. Further, a reception primary modulation symbol is obtained by performing IDFT processing by a PRB demapping circuit 24 and an M-point IDFT circuit 25.

An output of the M-point IDFT circuit 25 is demodulated by a demodulator 26 and the result is supplied to a deinterleave circuit 27. Deinterleave processing is performed in a deinterleave circuit 27, and the result is supplied to a channel decoder 28. An output of the channel decoder 28 is taken out from a reception sequence.

Figure 5:
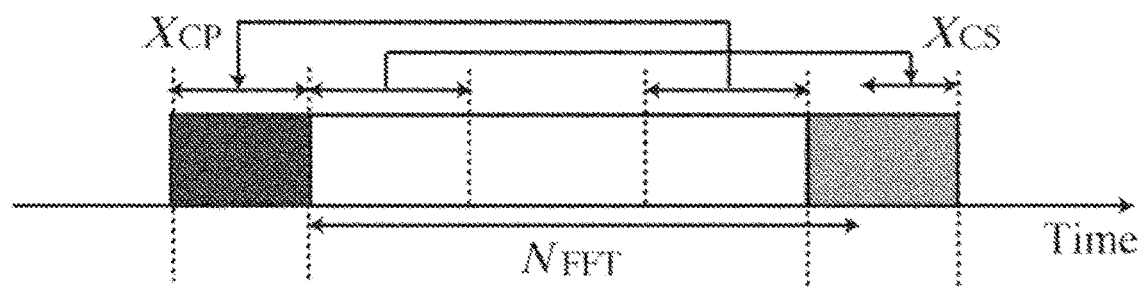
FIG. 5 is a timing chart used to describe generation of a transmission signal of the embodiment of the present invention.
Figure 5:
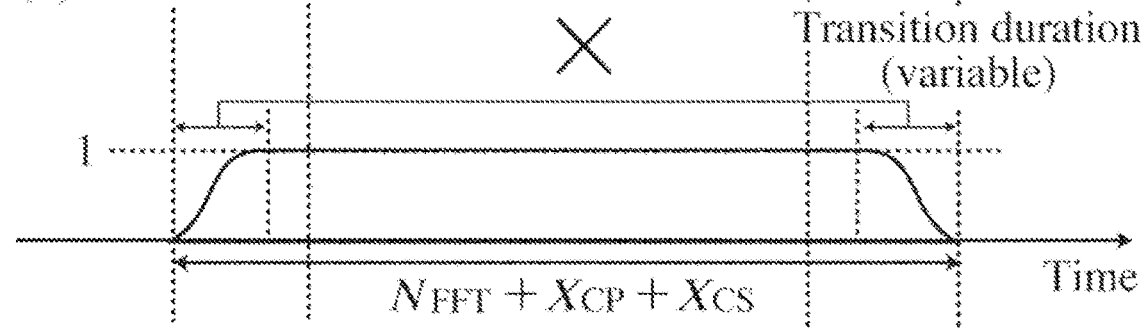
Figure 5:
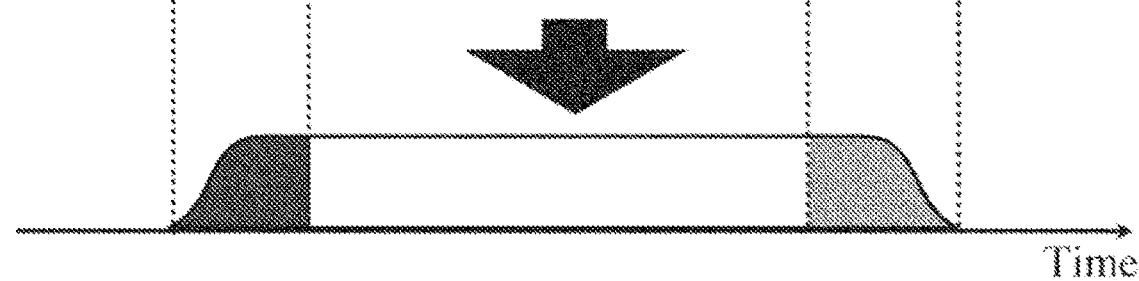

A transmission process of the embodiment of the present invention described above is described below. FIG. 5 illustrates generation of a transmission signal. The M-point DFT circuit 15 of FIG. 3 produces a frequency-domain subcarrier ($Z_k$) by the same process as eUF-DFTs-OFDM. A vector ($x_k$) (Mathematical Formula 1) (Equation 1) is generated in which a subcarrier is mapped to a resource element corresponding to an allocated resource block for data transmission and 0 is mapped to the other elements.

[Mathematical Formula 1]

$$x_k = [0^{1 \times M_1}, z_k^T, 0^{1 \times (N_{FFT} - M - M_1)}]^T \quad (1)$$

In (Equation 1), M (>=) 0, and zero in (Mathematical Formula 1) is a zero matrix of P rows and Q columns shown in (Mathematical Formula 2).

[Mathematical Formula 2]

$$0^{P \times Q}$$

Next, conversion to a time-domain waveform is performed by the $N_{FFT}$-point IFFT circuit 16. A CP having a length $X_{CP}$ and a CS (Cyclic-suffix) having a length $X_{CS}$ are added. A process including the insertion of the CP and the CS is represented by a matrix of (Mathematical Formula 3) as (Mathematical Formula 4) (Equation 2).

[Mathematical Formula 3]

$$V^{-1} \in \mathbb{C}^{(N_{FFT}+X_{CP}+X_{CS}) \times M}$$

[Mathematical Formula 4]

$$(V^{-1})_{l,m} = \exp[j 2\pi m(l - X_{CP})/N_{FFT}], \quad (2)$$

In (Equation 2), a relationship shown by (Mathematical Formula 5) holds:

[Mathematical Formula 5]

$$0 \le l < N_{FFT} + X_{CP} + X_{CS} \text{ and } 0 \le m < M.$$

Finally, a UTW-DFTs-OFDM transmission signal is obtained by applying a time-domain window (to be described later). A k-th symbol of the UTW-DFTs-OFDM transmission signal is represented by (Mathematical Formula 6) (Equation 3).

[Mathematical Formula 6]

$$s_k^{UTW} = W V^{-1} z_k, \quad (3)$$

In (Equation 3), a time-domain window matrix is represented by (Mathematical Formula 7).

[Mathematical Formula 7]

$$W \in \mathbb{C}^{(N_{FFT}+X_{CP}+X_{CS}) \times (N_{FFT}+X_{CP}+X_{CS})}$$

In the embodiment of the present invention, as a window function applied to the UTW-DFTs-OFDM scheme (or the UTW-OFDM scheme) described above, a new time window generated as a result of convolving an arbitrary filter into an arbitrary time window is used. For example, a result of convolving the LPF 9 used in processing of a modulation scheme (eUF-DFTs-OFDM) as a comparative example into a rectangular window is used as a new time window. The LPF 9 is, for example, a Dolph-Chebyshev filter.

A generation process of a time window function applied to the UTW-DFTs-OFDM scheme is described below. A restriction represented by (Equation 4) is introduced in order to exclude processing in which symbols are overlapped from the existing UTW-DFTs-OFDM scheme.

[Mathematical Formula 8]

$$X_{CP} + X_{CS} = L_{CP}. \quad (4)$$

Therefore, a time window matrix to be proposed is shown by (Mathematical Formula 9).

[Mathematical Formula 9]

$$W \in \mathbb{C}^{(N_{FFT}+L_{CP}) \times (N_{FFT}+L_{CP})}.$$

Since the processing in which symbols are overlapped is excluded, the number of multipliers required for waveform shaping may be 1. Even when symbol overlapping processing is performed, a window function generated by the present invention can be applied.

Figure 6:
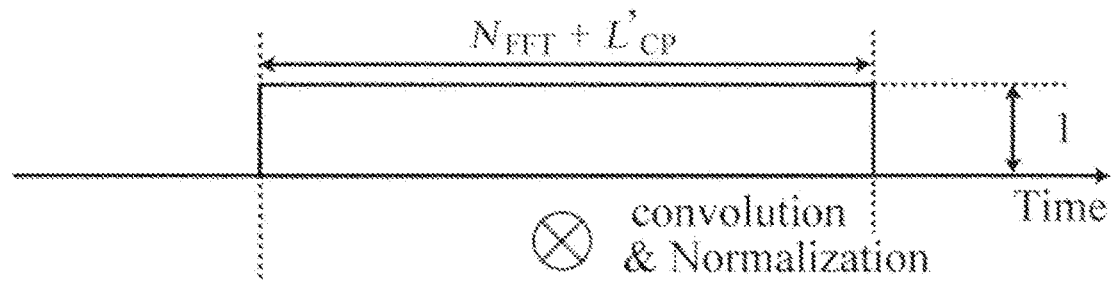
FIG. 6 is a timing chart for describing a generation process of a time window in the embodiment of the present invention.
Figure 6:
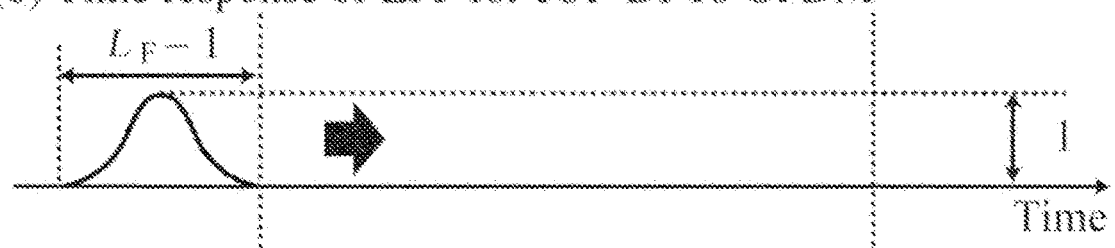
Figure 6:
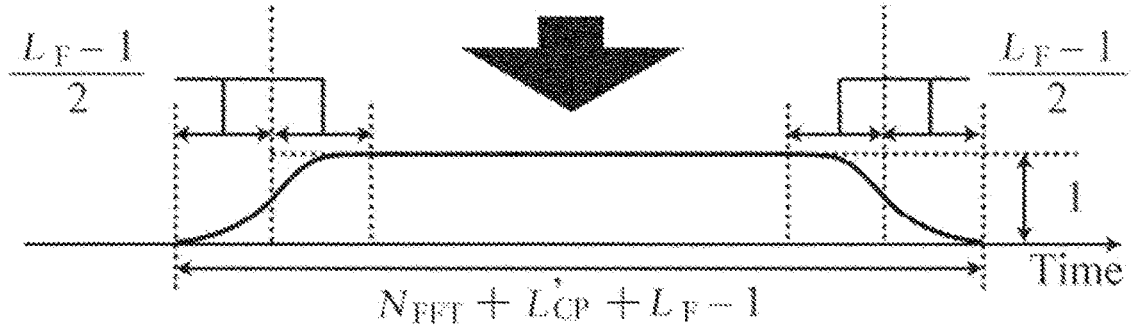

A time window function is formed as illustrated in FIG. 6. As illustrated in FIG. 6(a), first, a rectangular window having an amplitude 1 and a length $N_{FFT}+L_{CP}'$ is prepared. Here, $N_{FFT}$ and $L_{CP}$ respectively indicate an FFT size and a CP length defined by 3GPP. $L_F$ represents a time response length of an LPF applied to the rectangular window. Next, a proposed time window function (FIG. 6(c)) is generated by convolving an LPF having the time response illustrated in FIG. 6(b) into the rectangular window. An LPF impulse response is $g(n)$ ($0 \le n < L_F$). Therefore, the proposed time window matrix is represented by the following (Mathematical Formula 10) (Equation 5) using a diagonal matrix.

[Mathematical Formula 10]

$$W = \text{diag}\left(\frac{1}{N} G \mathbf{1}\right), \quad (5)$$

Here, (Mathematical Formula 11) indicates a rectangular window vector. Further, (Mathematical Formula 12) is a Toeplitz matrix that represents an LPF convolution integral, and is defined as the following (Mathematical Formula 13) (Equation 6), (Mathematical Formula 14) (Equation 7), and (Mathematical Formula 15) (Equation 8). Further, (Mathematical Formula 16) is a diagonal matrix with diagonal elements being a vector (a), and N indicates a normalization coefficient.

[Mathematical Formula 11]

$$\mathbf{1} = [1, 1, \ldots, 1]^T \in \mathbb{C}^{(N_{FFT}+L'_{CP}) \times 1}$$

[Mathematical Formula 12]

$$G \in \mathbb{C}^{(N_{FFT}+L_{CP}) \times (N_{FFT}+L'_{CP})}$$

[Mathematical Formula 13]

$$(G)_{p,0} = \begin{cases} g(p) & (0 \le p < L_F) \\ 0 & (L_F \le p < N_{FFT}+L_{CP}) \end{cases}, \quad (6)$$

[Mathematical Formula 14]

$$(G)_{0,q} = \begin{cases} g(0) & (q = 0) \\ 0 & (q \ne 0) \end{cases}, \quad (7)$$

[Mathematical Formula 15]

$$(G)_{p,q} = (G)_{p-1, q-1} (p \ne 0, q \ne 0). \quad (8)$$

[Mathematical Formula 16]

$$A = \text{diag}(a)$$

In this way, data of the proposed time window function (FIG. 6(c)) generated by the embodiment of the present invention is stored in the memory 19 of the transmitter, and time-domain windowing processing is performed in the time-domain windowing processing circuit 18.

Next, a normalized power spectrum density (PSD) (Relative Power Spectrum Density), PAPR characteristics, and BLER characteristics (blockerror rate) of the embodiment of the present invention (the UTW-DFTs-OFDM scheme to which the proposed time window function above-described is applied (hereinafter, this scheme referred to as the proposed UTW-DFTs-OFDM scheme)), the eUF-DFTs-OFDM scheme, and the conventional CP-DFTs-OFDM scheme were evaluated. In computer simulation, an LTE signal to which the specifications of Table 1 are applied is used.

TABLE 1

SIMULATION PARAMETER

| Parameter | Value |
|---|---|
| Bandwidth | 5.0 MHz |
| Sampling frequency | 7.68 MHz |
| Sub-frame | 1 ms |
| FFT size $N_{FFT}$ | 512 |
| DFT size M | 300 |
| GI length $L_{CP}$ | 128 |
| Number of slots per sub-frame | 2 |
| Number of RBs per slot B | 25 |
| Number of symbols per slot | 6 |
| Filter scheme | Dolph-Chebyshev |
| Filter length $L_F$ | 37 |
| Stop-band attenuation | 40 dB |

Figure 7:
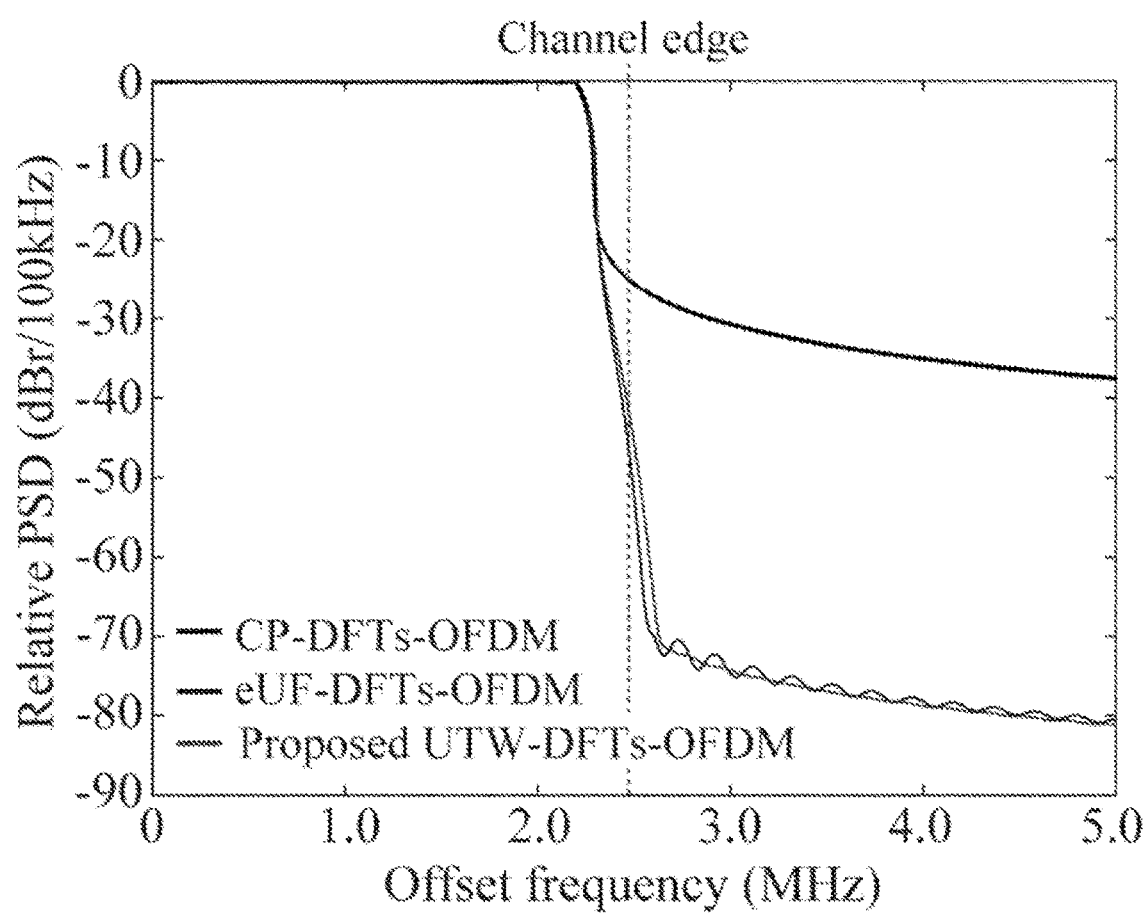
FIG. 7 is a graph for describing suppression performance of out-of-band emission of the embodiment of the present invention.

FIG. 7 is a graph of OOBE suppression performance at a channel edge. In FIG. 7, the horizontal axis represents a frequency offset and the vertical axis represents the normalized power spectrum density (PSD).

Figure 8:
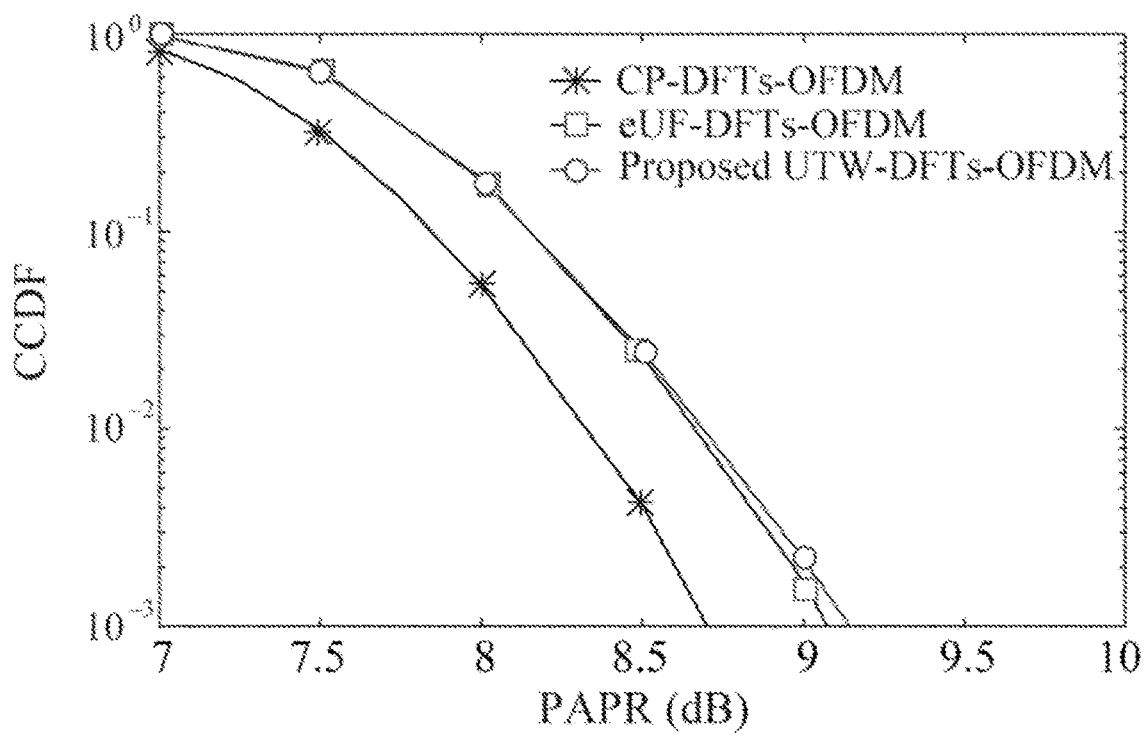
FIG. 8 is a graph for describing PAPR of the embodiment of the present invention.

FIG. 8 shows results of a PAPR complementary cumulative distribution function (CCDF).

Figure 9:
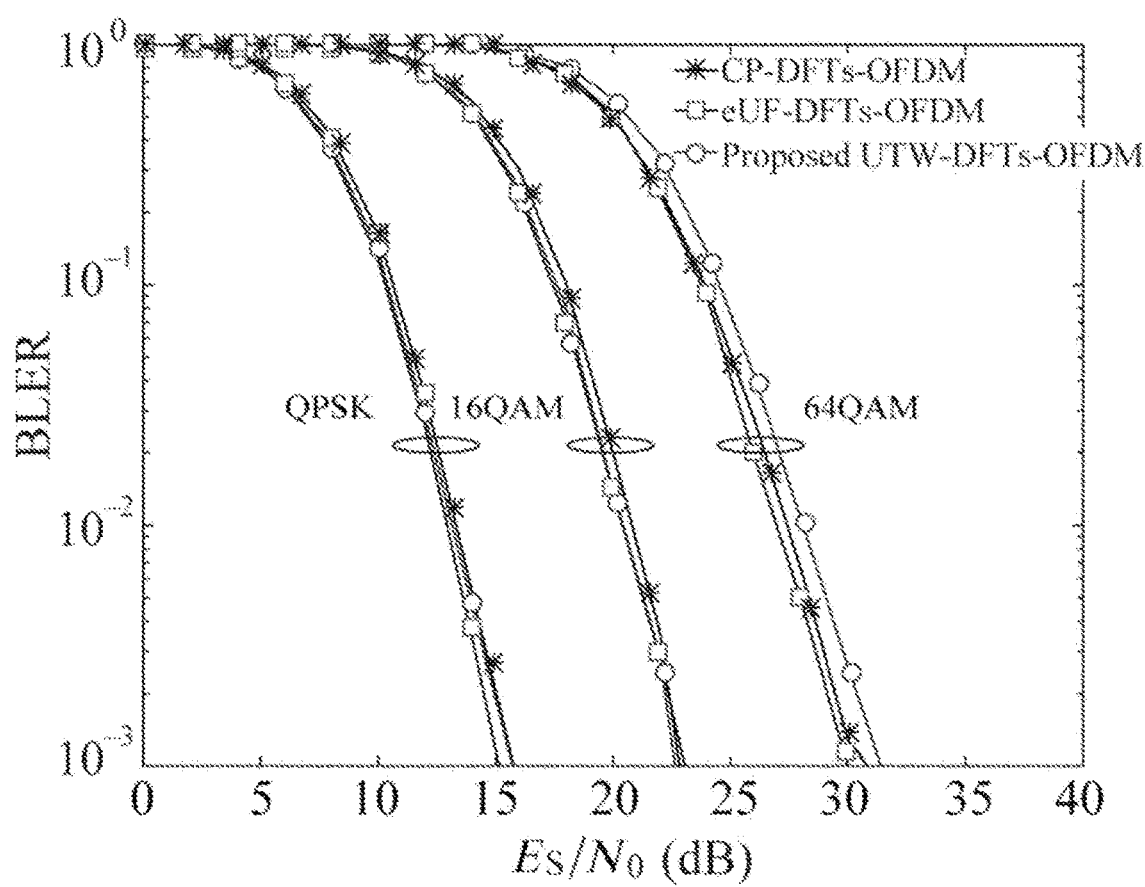
FIG. 9 is a graph showing BLER characteristics of the embodiment of the present invention.

FIG. 9 is a graph showing block error rate (BLER) characteristics. In FIG. 9, the horizontal axis represents Es/No (communication quality). BLER when using each of QPSK, 16QAM and 64QAM is shown. Parameters for block error rate (BLER) characteristics simulation are shown in Table 2.

TABLE 2

SIMULATION PARAMETER FOR BLER EVALUATION

| Parameter | Value |
|---|---|
| Modulation, Coding rate | QPSK, R = 0.59 |
| | 16QAM, R = 0.54 |
| | 64QAM, R = 0.54 |
| Channel coding scheme | Convolutional turbo coding |
| Number of available resource elements | 3,000 |
| Decoding scheme | Max-Log-MAP algorithm |
| Decoding iteration | 5 |
| Maximum Doppler frequency | 70 Hz |
| Channel model | 3GPP ETU [13] |

Results of the simulation are shown in the following Table 3.

TABLE 3

COMPREHENSIVE EVALUATION RESULT

| Schemes | OOBE (Relative PSD at offset frequency is 2.5 MHz) | PAPR (CCDF = $10^{-3}$) | Communication quality ($E_s/N_0$ to achieve BLER = $10^{-3}$) | Required number of multipliers to reduce OOBE |
|---|---|---|---|---|
| UTW-DFTs-OFDM applying proposed time-domain window | −43 dBr/100 kHz | 9.2 dB | QPSK: 15.1 dB<br>16QAM: 22.5 dB<br>64QAM: 31.8 dB | 1 |
| eUF-DFTs-OFDM | −45 dBr/100 kHz | 9.1 dB | QPSK: 15.1 dB<br>16QAM: 22.5 dB<br>64QAM: 31 dB | 925 (=$BL_F$) |
| CP-DFTs-OFDM | −25 dBr/100 kHz | 8.7 dB | QPSK: 15 dB<br>16QAM: 22.5 dB<br>64QAM: 30 dB | 0 |

As illustrated in FIGS. 7 and 9, the proposed UTW-DFTs-OFDM scheme and the eUF-DFTs-OFDM scheme are equivalent in PAPR characteristics and BLER characteristics. On the other hand, as illustrated in FIG. 7, both of two schemes have an improvement in OOBE of about 20 dB at a channel edge as compared to the conventional CP-DFTs-OFDM scheme. Further, regarding a circuit scale of a transmitting terminal, when B is defined as the number of sub-bands, the eUF-DFTs-OFDM scheme requires $BL_F$ multipliers to perform an LPF convolution integral for a purpose of suppressing OOBE. In this computer simulation, B=25 and $L_F$=37, and $BL_F$=925 multipliers are required. On the other hand, only one multiplier is required for the modulation of the embodiment of the present invention (the proposal UTW-DFTs-OFDM scheme). From the above results, the embodiment of the present invention can realize, with simple modulation processing using one multiplier, transmission and reception characteristics equivalent to those of the eUF-DFTs-OFDM scheme.

As described above, according to the embodiment of the present invention, a new time window function applied to UTW-DFTs-OFDM is provided for a purpose of suppressing OOBE with a simple transmitter structure. The proposed time window function is generated by convolving the LPF applied to the eUF-DFTs-OFDM scheme into a rectangular window. Further, OOBE characteristics, PAPR characteristics, BLER characteristics and the number of multipliers required for modulation of the UTW-DFTs-OFDM scheme to which the proposed time window function is applied were evaluated by computer simulation using an LTE uplink parameter. As a result, the embodiment of the present invention can realize transmission and reception characteristics equivalent to those of the eUF-DFTs-OFDM scheme by simply applying simple additional processing using one multiplier to the current scheme. The present invention can realize transmission and reception characteristics equivalent to those of UF-DFTs-OFDM, UF-OFDM, eUF-OFDM and the like which are similar schemes.

Next, another embodiment is described in which the present invention is applied to a UTW-OFDM or UTW-DFTs-OFDM scheme to which a raised cosine window is applied. A structure of a transmitter is the same as that of FIG. 3, and a structure of a receiver is the same as that of FIG. 4. In the other embodiment, a new time window is generated by convolving a Dolph-Chebyshev filter into a raised cosine window.

To describe a transmission process, first, multiple symbols of (Mathematical Formula 17) are subjected to M-point discrete Fourier transform (DFT) processing, and are transferred into a frequency domain of a subcarrier represented by (Mathematical Formula 18), and the results are represented by (Mathematical Formula 19) (Equation 11) and (Mathematical Formula 20) (Equation 12).

[Mathematical Formula 17]

$$a_k = [a_{(k,0)}, a_{(k,1)}, \ldots, a_{(k,M-1)}]^T \in \mathbb{C}^{M \times 1}$$

[Mathematical Formula 18]

$$z_k = [z_{(k,0)}, z_{(k,1)}, \ldots, z_{(k,M-1)}]^T \in \mathbb{C}^{M \times 1}$$

[Mathematical Formula 19]

$$z_k = F_M a_k, \quad (11)$$

[Mathematical Formula 20]

$$(F_M)_{p_1,p_2} = \exp[-j2\pi p_1 p_2 / M], \quad (12)$$

In (Equation 11) and (Equation 12), a DFT matrix is represented by (Mathematical Formula 21). Further, the relationships (0<=p1<M) and (0<=p2<M) hold.

[Mathematical Formula 21]

$$F_M \in \mathbb{C}^{M \times M}$$

Next, a vector $x_k$ (Mathematical Formula 22) (Equation 3) is generated in which a transmission vector $Z_k$ after DFT processing is mapped to an element corresponding to an allocated frequency band and 0 is mapped to the other elements. Equation (13) includes a zero matrix of P rows and Q columns.

[Mathematical Formula 22]

$$x_k [0^{1 \times M_1}, z_k^T, 0^{1 \times (N_{FFT} - M - M_1)}]^T, \quad (13)$$

The vector $x_k$ is subjected to N-point inversed fast Fourier transform (IFFT) processing. Further, as illustrated in FIG. 10(a), a CP having o length $L_{CP}$ is inserted, and OMs (Overlap margins) having lengths $L_{OM}$ and $L_{OM}+1$ are inserted between adjacent DFTs-OFDM transmission symbols.

Figure 10:
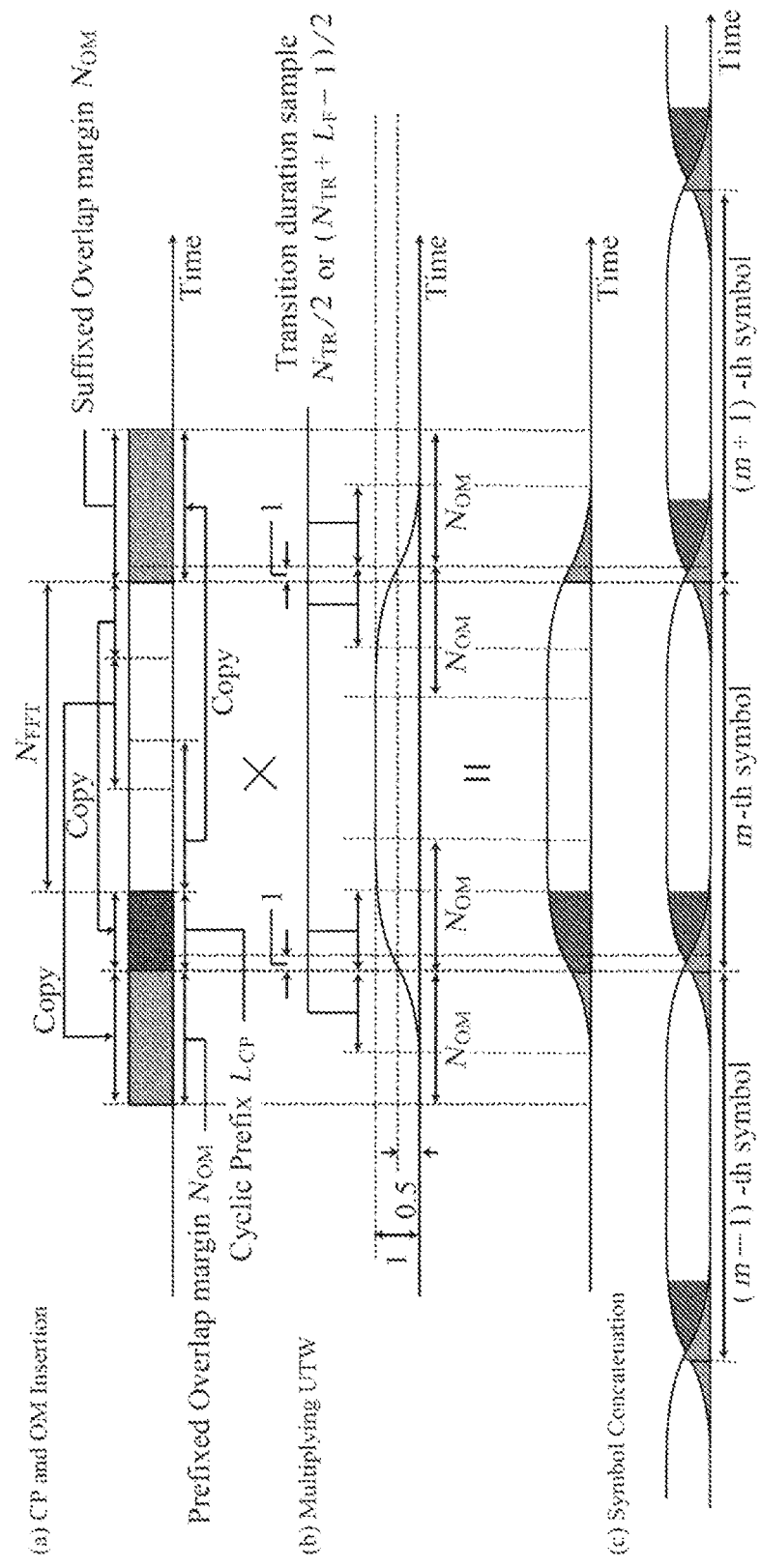
FIG. 10 is a timing chart used to describe generation of a transmission signal of another embodiment of the present invention.

When ($N_{GM} = N_{FFT} + L_{CP} + 2L_{OM} + 1$) is defined, a time window illustrated in FIG. 10(b) is multiplied and the k-th UTW-DFTs-OFDM symbol of (Mathematical Formula 23) is generated. This symbol is represented by (Mathematical Formula 24) (Equation 14) and (Mathematical Formula 25) (Equation 15).

[Mathematical Formula 23]

$$s_k \in \mathbb{C}^{N_{GM} \times 1}$$

[Mathematical Formula 24]

$$s_k = W F_{GM}^{-1} x_k, \quad (14)$$

[Mathematical Formula 25]

$$(F_{GM}^{-1})_{l,m} = \exp[j2\pi m(1 - L_{CP} - N_{OM}) / N_{FFT}], \quad (15)$$

Here, a time window matrix is shown by (Mathematical Formula 26).

[Mathematical Formula 26]

$$W \in \mathbb{C}^{N_{GM} \times N_{GM}}$$

Further, an IDFT matrix with CP and OMs inserted is shown by (Mathematical Formula 27). Here, the relationships (0<=1<$N_{GM}$) and (0<=m<M) hold.

[Mathematical Formula 27]

$$F_{GM}^{-1} \in \mathbb{C}^{N_{GM} \times M}$$

Finally, as illustrated in FIG. 10(c), front and back OMs of adjacent transmission symbols are joined so as to overlap each other, and a UTW-DFTs-OFDM transmission signal is generated. The structure of the receiver is the same as that described above, and thus, a description thereof is omitted.

In the UTW-DFTs-OFDM scheme to which the conventional raised cosine window (RCW) is applied, it is necessary to extend a transition length NTR of a time window in order to strongly suppress OOBE. However, waveform distortion becomes large, causing serious deterioration in communication quality. By applying the present invention, it is possible to have a large OOBE suppression performance even with a short window transition length. This new proposed time window is referred to as f-RCW.

In a scheme in which a conventional RCW is used as a time window, as a matrix representing multiplication of the time window and as a RCW matrix represented by (Mathematical Formula 28), those represented by (Mathematical Formula 29) (Equation 16) and (Mathematical Formula 30) (Equation 17) are applied. Further, the relationships of (Mathematical Formula 31) (Equation 18), (Mathematical Formula 32) (Equation 19) and (Mathematical Formula 33) (Equation 20) hold.

[Mathematical Formula 28]

$$W^{RCW} \in \mathbb{C}^{N_{GM} \times N_{GM}}$$

[Mathematical Formula 29]

$$W^{RCW} = \text{diag}(w^{RCW}), \quad (16)$$

[Mathematical Formula 30]

$$w^{RCW} = \begin{bmatrix} 0^{(N_{OM}-N_{TR}/2) \times 1} \\ w_{TR} \\ 1^{(N_{FFT}+L_{CP}-N_{TR}+1) \times 1} \\ w_{TR}^I \\ 0^{(N_{OM}-N_{TR}/2) \times 1} \end{bmatrix}, \quad (17)$$

[Mathematical Formula 31]

$$w_{TR} = [w_0, w_1, \ldots, w_{N_{TR}-2}, w_{N_{TR}-1}]^T, \quad (18)$$

[Mathematical Formula 32]

$$w_{TR}^I = [w_{N_{TR}-1}, w_{N_{TR}-2}, \ldots, w_1, w_0]^T, \quad (19)$$

[Mathematical Formula 33]

$$w_n = \sin^2(n\pi/2N_{TR}), \quad (20)$$

In (Mathematical Formula 29), diag(a) is a diagonal matrix with diagonal elements being a vector (a), and (Mathematical Formula 34) is a matrix with all components being 1. Further, (Mathematical Formula 35) and (Mathematical Formula 36) are respectively an RCW transition vector and an RCW inverse transition vector.

[Mathematical Formula 34]

$$1^{P \times Q} \in \mathbb{C}^{P \times Q}$$

[Mathematical Formula 35]

$$w_{TR} \in \mathbb{C}^{N_{TR} \times 1}$$

[Mathematical Formula 36]

$$w_{TR}^I \in \mathbb{C}^{N_{TR} \times 1}$$

Therefore, the k-th UTW-DFTs-OFDM symbol of the UTW-DFTs-OFDM scheme to which a conventional RCW is applied is represented by (Mathematical Formula 37) (Equation 21).

[Mathematical Formula 37]

$$s_k^{RCW} = W^{RCW} F_{GM}^{-1} x_k. \quad (21)$$

Figure 11:
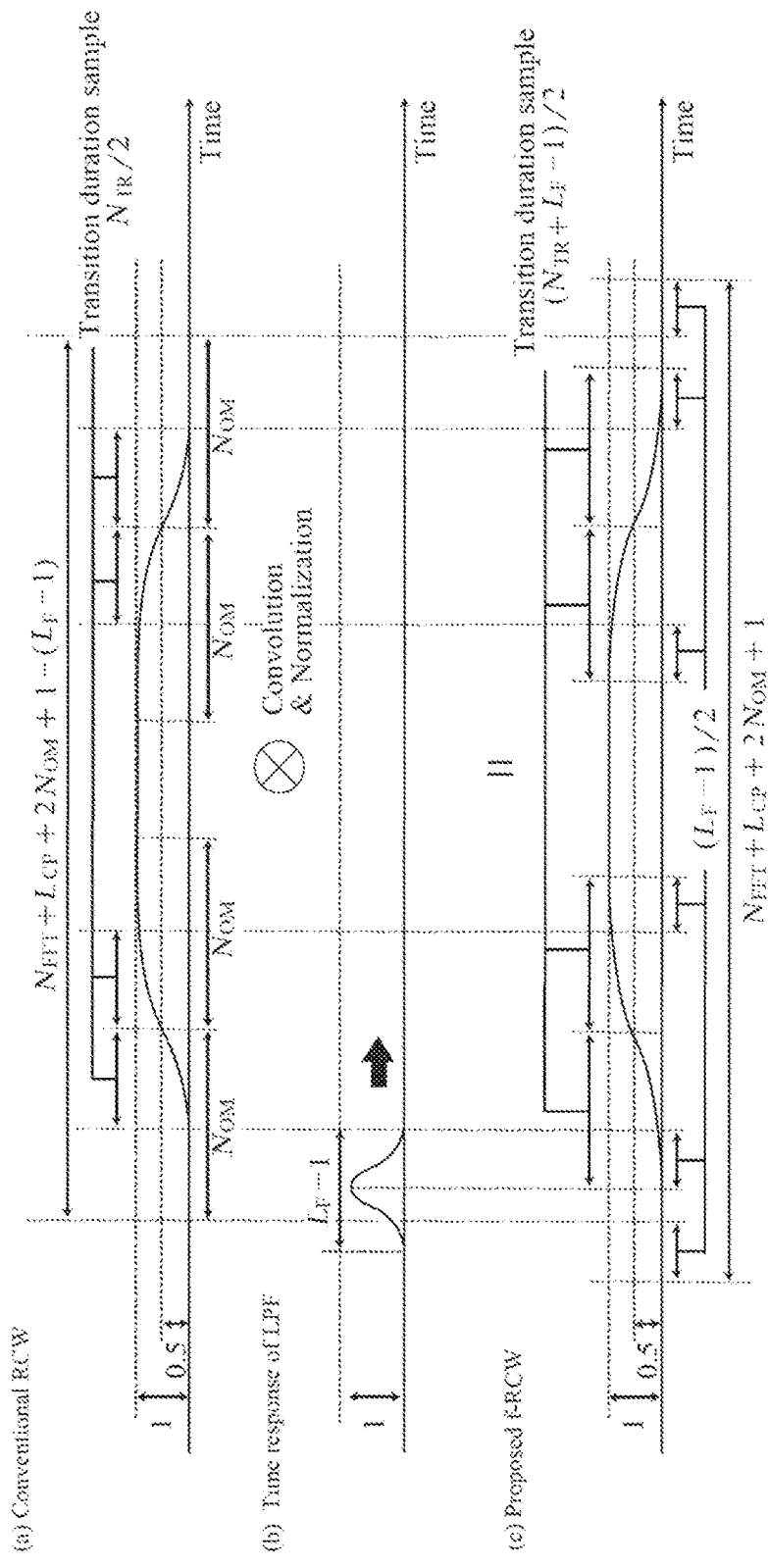
FIG. 11 is a timing chart for describing a generation process of a time window in the other embodiment of the present invention.

Next, a generation process of the proposed time window (f-RCW) according to the other embodiment of the present invention is described with reference to FIG. 11. First, an RCW vector (Mathematical Formula 38) having a length $N_{GM} - (L_F - 1)$ defined by (Mathematical Formula 39) (Equation 22) is prepared.

[Mathematical Formula 38]

$$w^{RCW'} \in \mathbb{C}^{(N_{GM}-(L_F-1)) \times 1}$$

[Mathematical Formula 39]

$$w^{RCW'} = \begin{bmatrix} 0^{(N_{OM}-N_{TR}/2) \times 1} \\ w_{TR} \\ 1^{(N_{FFT}+L_{CP}-(L_F-1)-N_{TR}+1) \times 1} \\ w_{TR}^I \\ 0^{(N_{OM}-N_{TR}/2) \times 1} \end{bmatrix} \quad (22)$$

Here, $L_F$ is an LPF time response length. Finally, a proposed RCW vector (Mathematical Formula 40) is generated by convolving an LPF into a RCW vector on a time axis.

[Mathematical Formula 40]

$$w^{f-RCW} \in \mathbb{C}^{N_{GM} \times 1}$$

The LPF convolution on the time axis is expressed by (Mathematical Formula 41) (Equation 23).

[Mathematical Formula 41]

$$w^{f-RCW} = \frac{1}{N} G w^{RCW'}, \quad (23)$$

Here, N is a normalizing coefficient. Further, (Mathematical Formula 42) is a Toeplitz matrix representing an LPF convolution integral of the time axis, and is defined by (Mathematical Formula 43) (Equation 24) (Equation 25) (Equation 26).

[Mathematical Formula 42]

$$G \in \mathbb{C}^{N_{GM} \times (N_{GM}-L_F+1)}$$

[Mathematical Formula 43]

$$(G)_{p,0} = \begin{cases} g(p) & (0 \le p < L_F) \\ 0 & (L_F \le p < N_{GM}) \end{cases}, \quad (24)$$

$$(G)_{0,q} = \begin{cases} g(0) & (q = 0) \\ 0 & (q \ne 0) \end{cases}, \quad (25)$$

$$(G)_{p,q} = (G)_{p-1,q-1} (p \ne 0, q \ne 0), \quad (26)$$

Here, g(n) (0<1=n<LP) is an LPF impulse response. Therefore, the k-th symbol of the UTW-DFTs-OFDM scheme to which the proposed f-RCW is applied is represented by (Mathematical Formula 44) (Equation 27) and (Mathematical Formula 45) (Equation 28). Finally, as illustrated in FIG. 10(c), a transmission symbol is generated by joining adjacent symbols.

Figure 12:
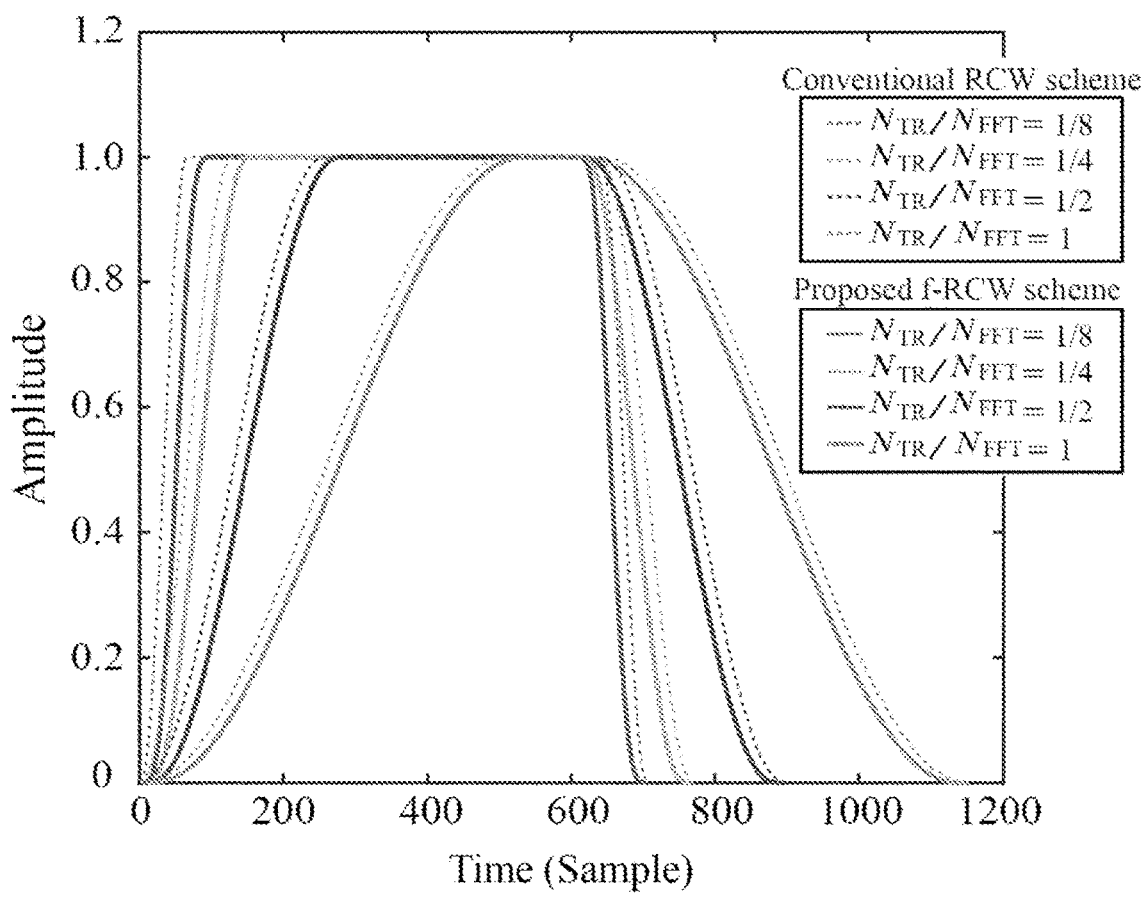
FIG. 12 is a waveform diagram for describing the other embodiment of the present invention.

FIG. 12 illustrates waveforms of the UTW-DFTs-OFDM scheme to which a conventional RCW is applied (hereinafter, this scheme is referred to as the conventional RCW scheme) and the UTW-DFTs-OFDM scheme to which the proposed f-RCW is applied (hereinafter, this scheme is referred to as the proposed f-RCW scheme) under conditions of $N_{TR}/N_{FFT}$=⅛, ¼, ½, and 1. The proposed f-RCW has a gentler change at both ends of a waveform as compared to the conventional RCW, and can further alleviate a signal discontinuity between symbols.

Simulation is described below. In the simulation, OOBE characteristics, PAPR characteristics, and BLER characteristics of the conventional CP-DFTs-OFDM scheme, the conventional RCW scheme, and the proposed f-RCW scheme are evaluated by computer simulation using an LTE uplink parameter. As a channel model, a 3GPP Extended Typical Urban (ETU) model assuming a long-delay propagation environment in which a maximum delay of a delay wave is 5.0 μs was used. Therefore, in the simulation, an extended CP mode longer than a normal CP was used.

A. OOBE Suppression

Figure 13:
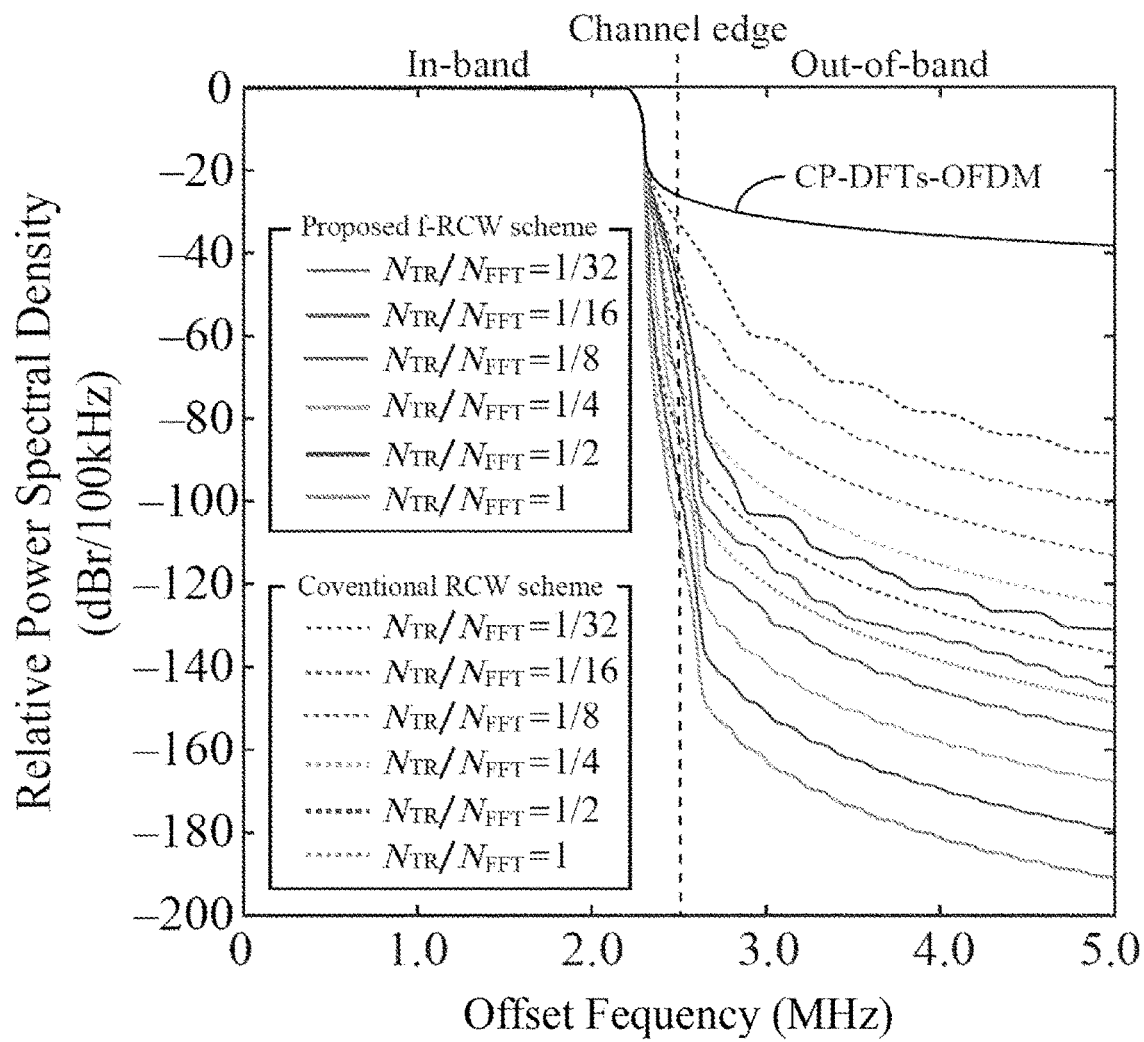
FIG. 13 is a graph for describing OOBE suppression of the other embodiment of the present invention.

FIG. 13 shows results obtained by generating transmission signals of the proposed f-RCW scheme, the conventional RCW scheme, and the conventional CP-DFTs-OFDM scheme according to evaluation specifications of Table 4 and evaluating a Max-hold value of a normalized power spectrum density (Relative Power Spectrum Density; PSD). However, the evaluation was performed with a resolution bandwidth of 100 kHz and a 4-times oversampling.

TABLE 4

SIMULATION PARAMETERS

| Parameter | Value |
| --- | --- |
| Bandwidth | 5.0 MHz |
| Sampling frequency | 7.68 MHz |
| FFT size $N_{FFT}$ | 512 |
| DFT size M | 300 |
| GI length $L_{CP}$ | 128 |
| Number of slots per sub-frame | 2 |
| Number of RBs per slot | 25 |
| Number of symbols per slot | 6 |
| Transition time of RCW $N_{TR}$ | 16, 32, 64, 128, 256, 512 |
| Overlap margin $N_{OM}$ | $N_{TR}/2$ |
| LPF type | Dolph-Chebyshev |
| Filter length $L_F$ of LPF | 37 |
| Stop-band attenuation of LPF | 40 dB |

As compared to the conventional RCW scheme, the proposed f-RCW scheme can improve OOBE by about 12 dB at a channel edge (that is, an offset frequency from a center frequency is 2.5 MHz) with respect to window transition lengths ($N_{TR}/N_{FFT}=1/32$, $N_{TR}/N_{FFT}=1/16$, $N_{TR}/N_{FFT}=1/8$, $N_{TR}/N_{FFT}=1/4$, $N_{TR}/N_{FFT}=1/2$, and $N_{TR}/N_{FFT}=1$). Further, in a frequency domain where the offset frequency from the center frequency is larger than 2.65 MHz, OOBE can be improved by about 40 dB. As a result, as compared to the conventional CP-DFTs-OFDM scheme, the proposed f-RCW scheme can improve up to 82 dB at a channel edge, and can improve up to 150 dB in a frequency domain where the offset frequency from the center frequency is larger than 2.65 MHz. This is because, in a generation process of a time window, by further convolving an LPF with respect to an RCW on a time axis, rising of a transition portion of the time window can become smoother and a signal discontinuity can be more strongly alleviated. Further, from a point of view of a frequency domain, this is because a side lobe of the conventional RCW scheme can be directly reduced by being multiplied by an LPF.

B. PAPR (Peak-to-Average Power Characteristics)

Figure 14:
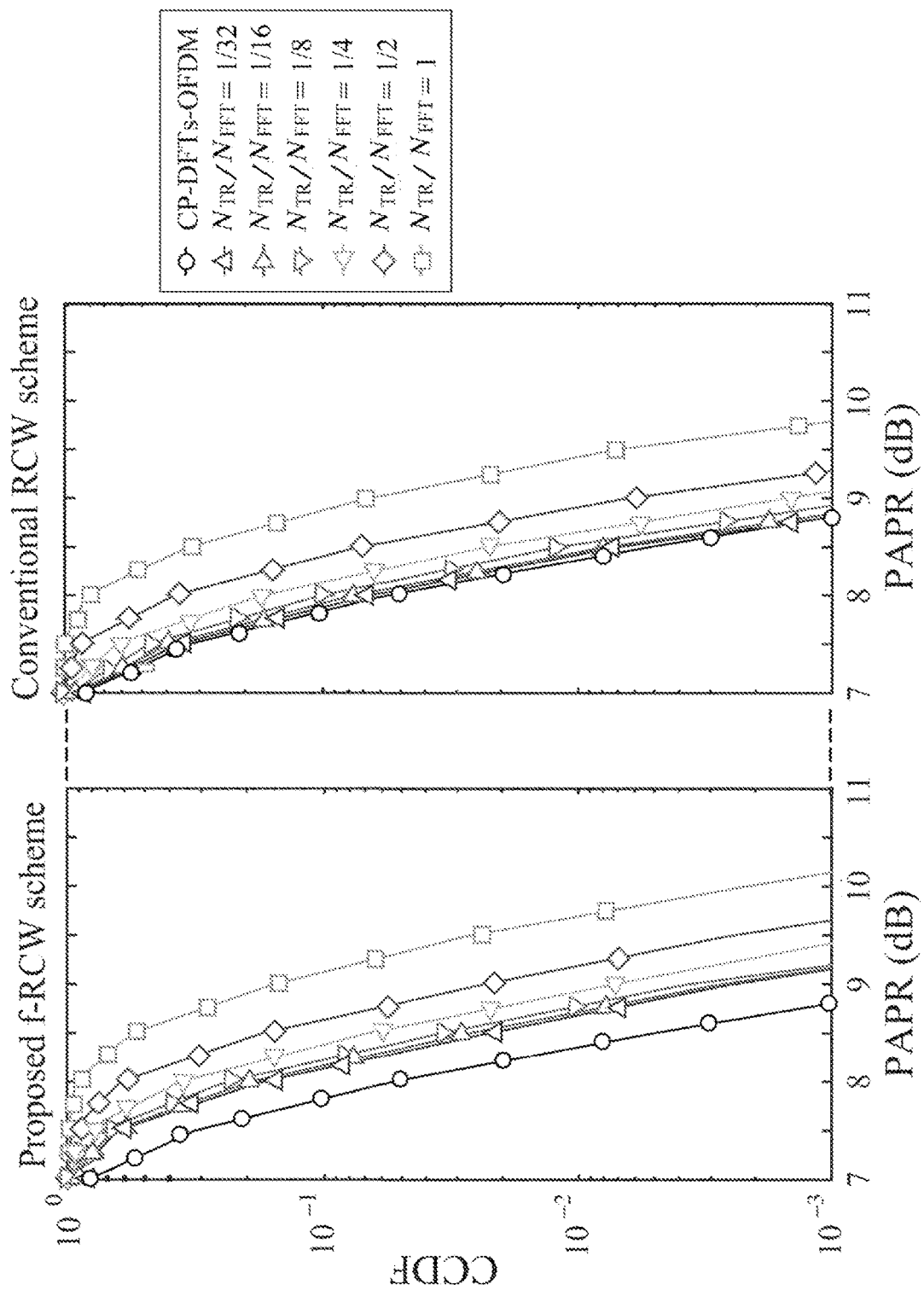
FIG. 14 is a graph for describing PAPR of the other embodiment of the present invention.

PAPR characteristics of transmission signals of the proposed f-RCW scheme, the conventional RCW scheme, and the conventional CP-DFTs-OFDM scheme were evaluated according to the evaluation specifications of Table 4. However, a modulation scheme is QPSK. FIG. 14 shows results of a PAPR complementary cumulative distribution function (CCDF) obtained by computer simulation. It can be seen that the proposed f-RCW scheme has substantially equivalent PAPR characteristics with respect to each window transition length as compared to the conventional RCW scheme.

C. BLER (Block Error Rate Characteristics)

Specifications used in BLER characteristics evaluation are shown in Table 5.

TABLE 5

PARAMETERS FOR BLER EVALUATION

| Parameter | Value |
| --- | --- |
| Modulation, Coding rate | QPSK, R = 0.59 |
| | 16QAM, R = 0.54 |
| | 64QAM, R = 0.54 |
| Channel coding scheme | Convolutional turbo coding |
| Number of available REs | 3,000 |
| Decoding scheme | Max-Log-MAP algorithm |
| Decoding iteration | 5 |
| Max Doppler frequency | 70 Hz |
| Channel model | 3GPP Extended Typical Urban [11] |

In the simulation, for simplicity, it is assumed that one transport block is allocated to one subframe and all resource blocks are occupied by one user. Further, as a channel model, an ETU model having a Doppler frequency of 70 Hz was used assuming a long-delay propagation environment. Further, on the receiving side, for the proposed f-RCW scheme, the conventional RCW scheme, and the conventional CP-DFTs-OFDM scheme, frequency domain equalization is performed and channel fluctuation due to multipath fading is compensated. In an LTE uplink using an extended CP, a demodulation reference signal is transmitted using a third symbol of each slot. After estimating channel fluctuation using the demodulation reference signal, linear interpolation in a time direction is performed and fluctuations of all symbols are estimated. Further, for channel equalization on the receiving side, an MMSE (Minimum Mean Square Error) filter was used. The MMSE filter is designed to minimize a mean square error (MSE) between a transmission signal and a signal after channel equalization.

Figure 15:
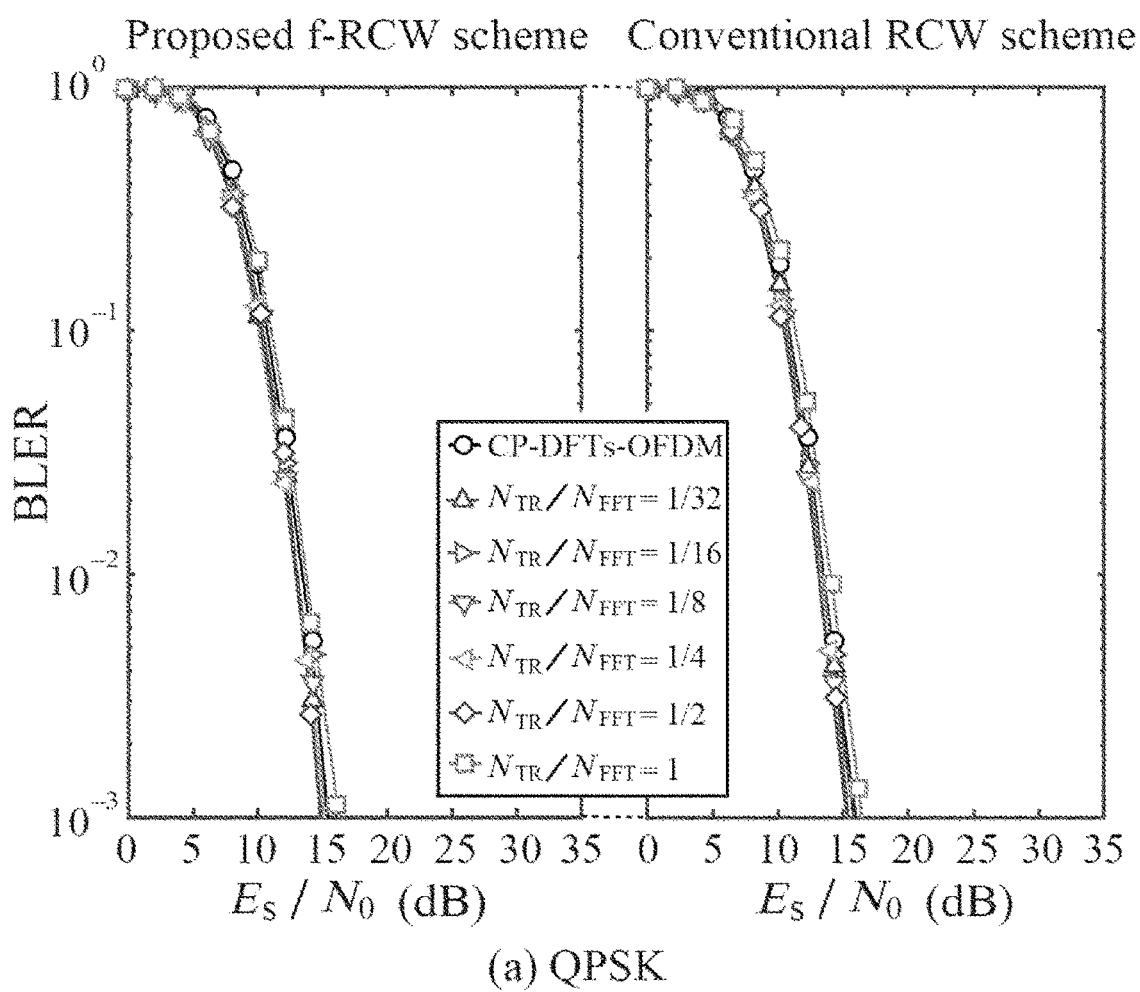
FIG. 15 is a graph for describing BLER of the other embodiment of the present invention.

When QPSK is used, Es/No (communication quality) of the proposed f-RCW scheme at which BLER=$10^{-3}$ is achieved shows a value equivalent to those of the conventional RCW scheme and the conventional CP-DFTs-OFDM scheme with respect to each window transition length NTR (see FIG. 15).

Figure 16:
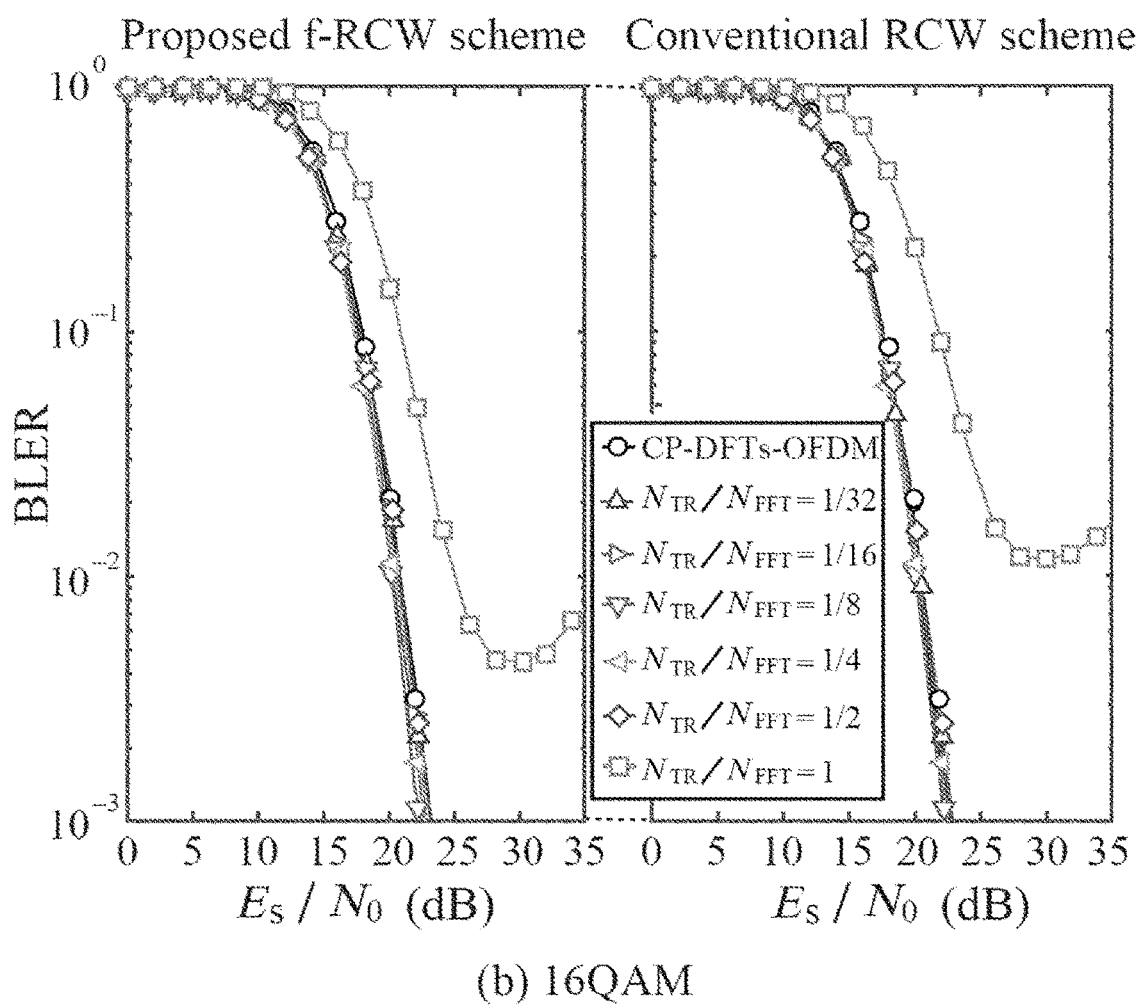
FIG. 16 is a graph for describing BLER of the other embodiment of the present invention.

When 16QAM is used, the Es/No of the proposed f-RCW scheme at which BLER=$10^{-3}$ is achieved shows a value equivalent to those of the conventional RCW scheme and the conventional CP-DFTs-OFDM scheme when $N_{TR}/N_{FFT} \leq 1/2$ (see FIG. 16).

Figure 17:
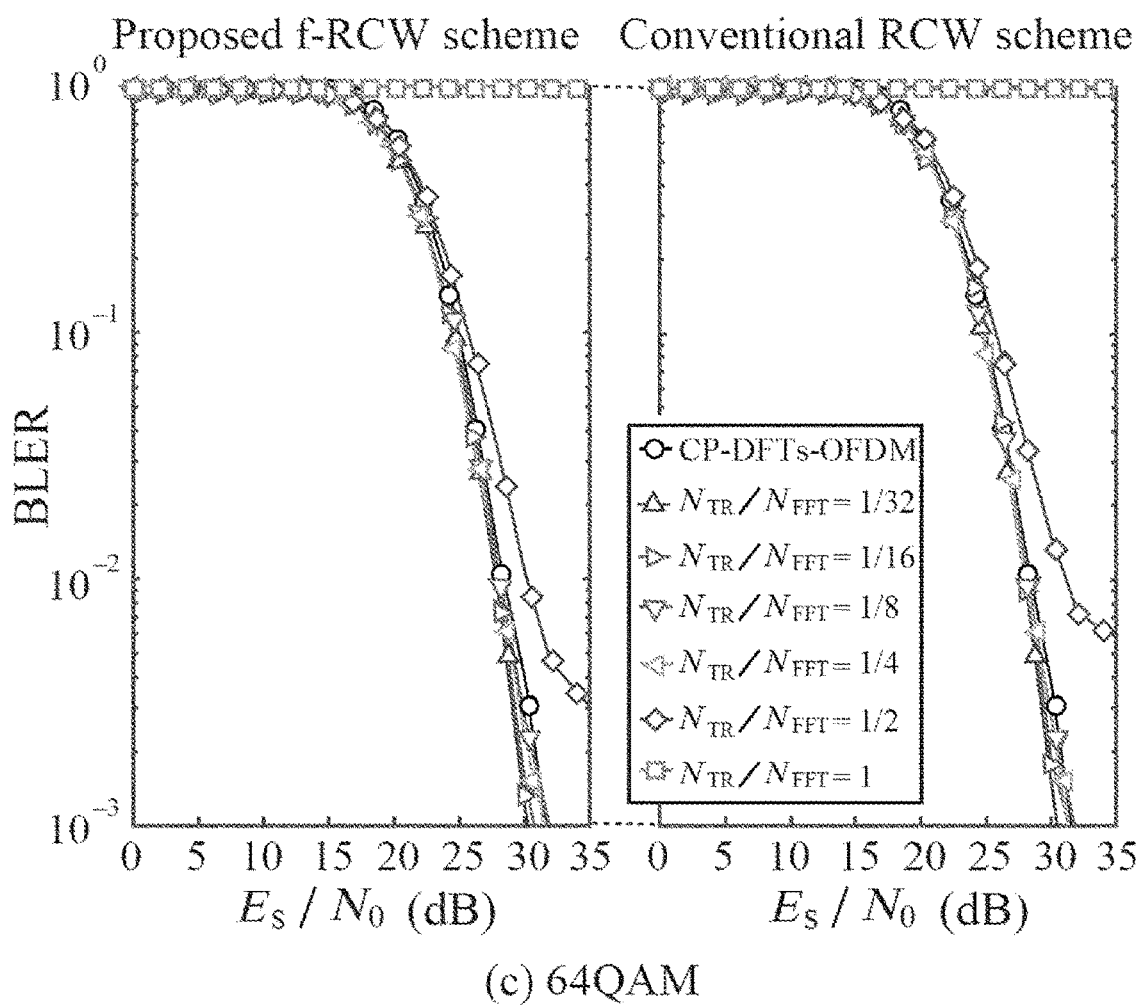
FIG. 17 is a graph for describing BLER of the other embodiment of the present invention.

When 64QAM is used, the Es/No of the proposed f-RCW scheme at which BLER=$10^{-3}$ is achieved shows a value equivalent to those of the conventional RCW scheme and the conventional CP-DFTs-OFDM scheme when $N_{TR}/N_{FFT} \leq 1/4$ (see FIG. 17).

That a floor error occurs when a window transition length is large in 16QAM or 64QAM is because of influence of intersymbol interference or intercarrier interference caused by the time window.

Figure 18:
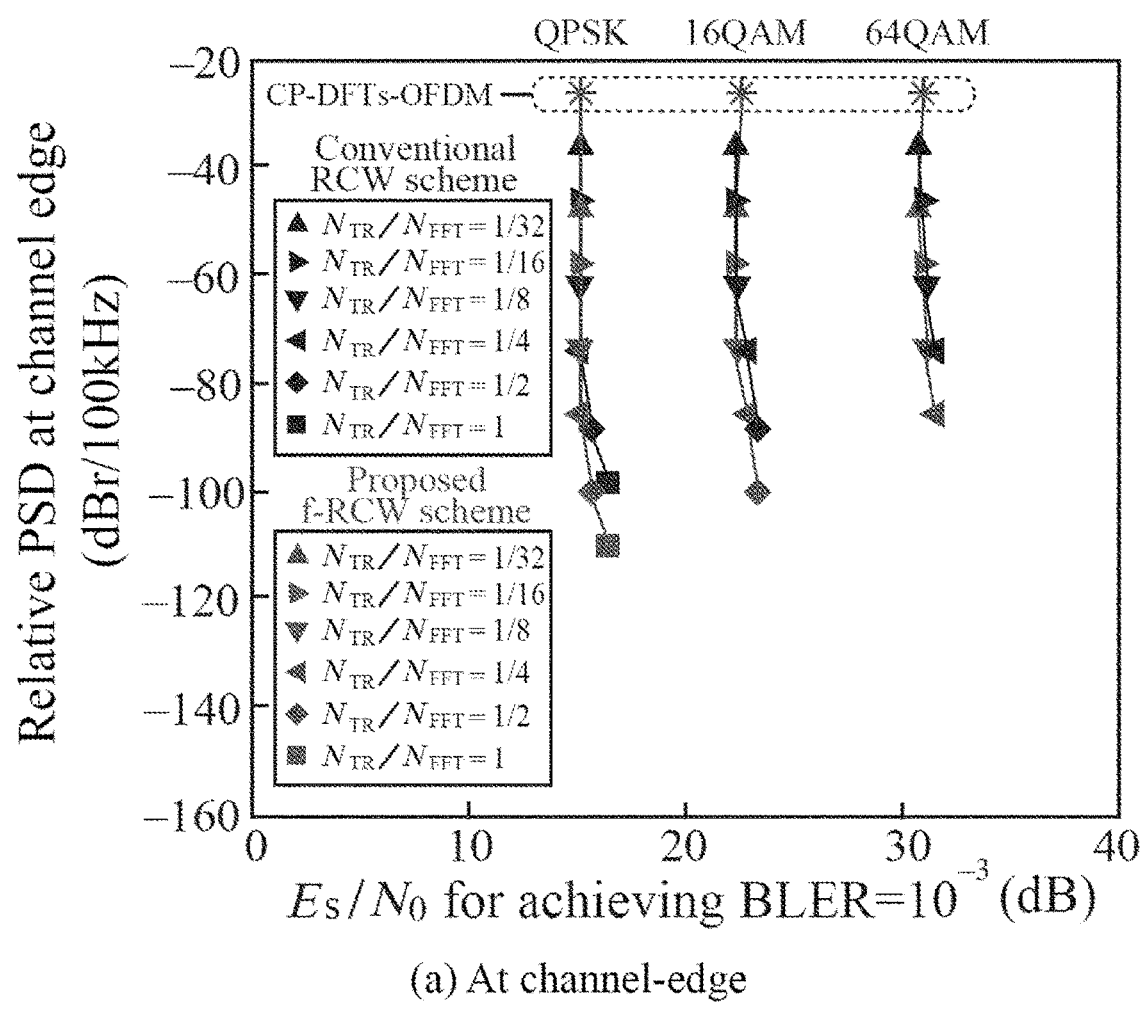
FIG. 18 is a graph showing results of evaluation based on both OOBE characteristics and BLER characteristics of the other embodiment of the present invention.

Next, in order to comprehensively show the effectiveness of the proposed f-RCW scheme, the proposed f-RCW scheme was evaluated based on both OOBE characteristics and BLER characteristics. FIG. 18 shows a relationship between the Es/No (communication quality) at which BLER=$10^{-3}$ is achieved and the relative PSD (OOBE suppression performance) at a channel edge when $N_{TR}/N_{FFT}$ is changed.

In the case where QPSK is used, when the Es/No at which BLER=$10^{-3}$ is achieved is allowed to deteriorate by 0.8 dB, the proposed f-RCW scheme can improve OOBE by about 90 dB as compared to the conventional CP-DFTs-OFDM scheme and about 12 dB as compared to the conventional RCW scheme.

In the case where 16QAM is used, when the Es/No at which BLER=$10^{-3}$ is achieved is allowed to deteriorate by 0.1 dB, the proposed f-RCW scheme can improve OOBE by about 75 dB as compared to the conventional CP-DFTs-OFDM scheme and about 12 dB as compared to the conventional RCW scheme.

In the case where 64QAM is used, when the Es/No at which BLER=$10^{-3}$ is achieved is allowed to deteriorate by 0.2 dB, the proposed f-RCW scheme can improve OOBE by about 65 dB as compared to the conventional CP-DFTs-OFDM scheme and about 12 dB as compared to the conventional RCW scheme.

Figure 19:
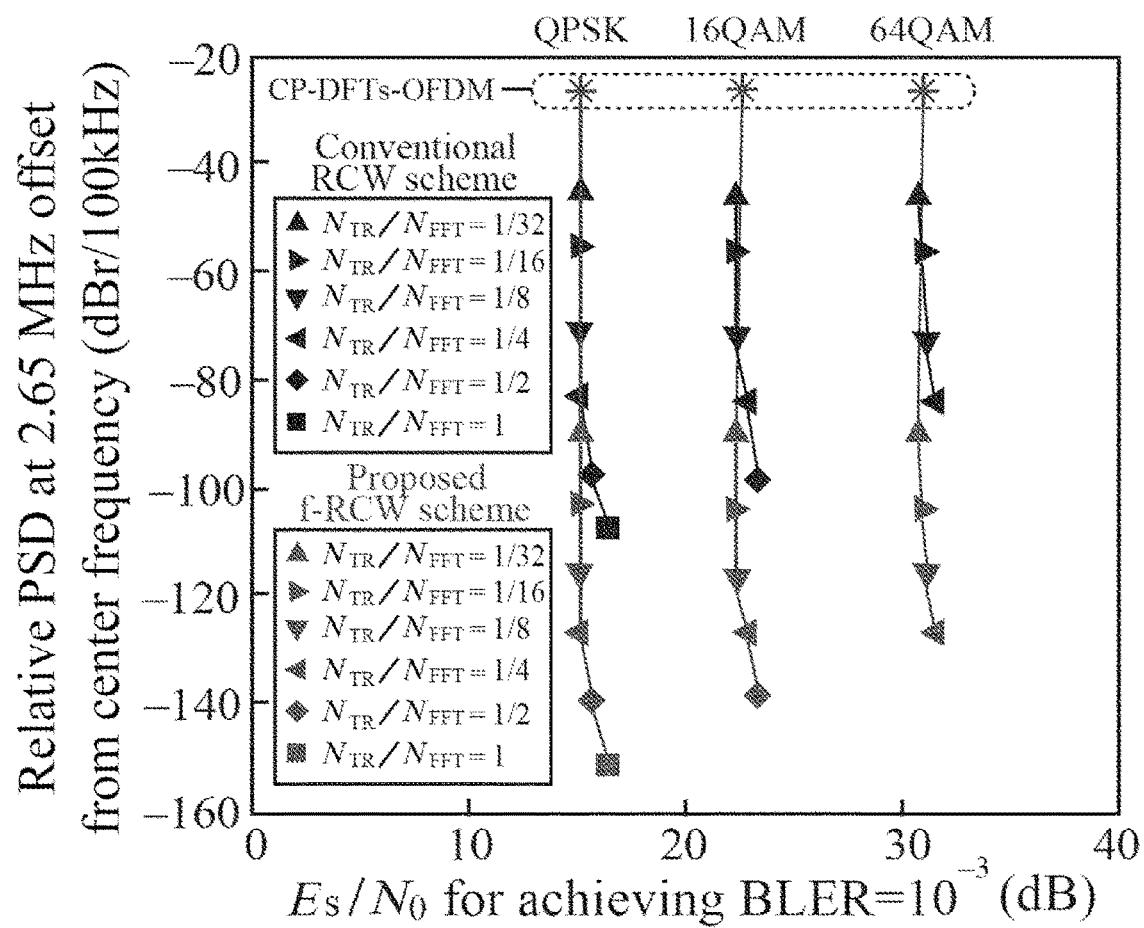
FIG. 19 is a graph showing results of evaluation based on both OOBE characteristics and BLER characteristics of the other embodiment of the present invention.

FIG. 19 shows a relationship between the Es/No (communication quality) at which BLER=$10^{-3}$ is achieved and the relative PSD (OOBE suppression performance) in a frequency domain where the offset frequency from the center frequency is greater than 2.65 MHz when $N_{TR}/N_{FFT}$ is changed.

In the case where QPSK is used, when the Es/No at which BLER=$10^{-3}$ is achieved is allowed to deteriorate by 0.8 dB, the proposed f-RCW scheme can improve OOBE by about 115 dB as compared to the conventional CP-DFTs-OFDM scheme and about 42 dB as compared to the conventional RCW scheme.

In the case where 16QAM is used, when the Es/No at which BLER=$10^{-3}$ is achieved is allowed to deteriorate by 0.1 dB, the proposed f-RCW scheme can improve OOBE by about 100 dB as compared to the conventional CP-DFTs-OFDM scheme and about 42 dB as compared to the conventional RCW scheme.

In the case where 64QAM is used, when the Es/No at which BLER=$10^3$ is achieved is allowed to deteriorate by 0.2 dB, the proposed f-RCW scheme can improve OOBE by about 90 dB as compared to the conventional CP-DFTs-OFDM scheme and about 42 dB as compared to the conventional RCW scheme.

As described above, the other embodiment of the present invention proposes a new time window generated by combining a RCW and a LPF in order to further improve the OOBE suppression performance of the UTW-DFTs-OFDM scheme to which the conventional RCW, which has been useful in an LTE uplink, is applied. OOBE suppression characteristics, PAPR characteristics and BLER characteristics of the UTW-DFTs-OFDM scheme to which the new time window is applied were evaluated by computer simulation. As a result, when the window transition length of the time window is $N_{TR}/N_{FFT} \leq 1/4$, regardless of a modulation scheme, the UTW-DFTs-OFDM scheme to which the proposed time window is applied can suppress OOBE by about 12 dB at a channel edge and can further suppress OOBE by about 40 dB in a frequency domain where the offset frequency is larger than 2.65 MHz, while maintaining a communication quality equivalent to that of the UTW-DFTs-OFDM scheme to which the conventional RCW is applied. From the above results, it can be seen that the UTW-DFTs-OFDM scheme to which the proposed time window is applied is a useful scheme that can significantly improve the OOBE suppression performance while maintaining a communication quality equivalent to that of the UTW-DFTs-OFDM method to which the conventional RCW is applied.

In the above, the embodiments of the present invention are specifically described. However, the present invention is not limited to the above-described embodiments, and various modifications based on the technical ideas of the present invention are possible. For example, the present invention can also be applied to windows other than a rectangular window and a raised cosine window (RCW). Further, it is also possible to convolve a filter having characteristics other than those of an LPF.

DESCRIPTION OF REFERENCE NUMERALS

11: channel encoder
12: interleave circuit
13: modulator
14: PRB mapping circuit
15: M-point DFT circuit
16: $N_{FFT}$-point FFT circuit
17: CP insertion circuit
18: windowing circuit
19: memory

The invention claimed is:

1. A transmission device comprising:
a time-domain windowing processing circuit configured to:
input a transmission symbol, and
multiply the transmission symbol by a time window,
wherein
the time window is determined based on a result of convolving an arbitrary filter into an arbitrary time window.

2. The transmission device according to claim 1, wherein an orthogonal frequency division multiplexing (OFDM) is used as a modulation scheme.

3. The transmission device according to claim 1, wherein the time window is a rectangular window.

4. The transmission device according to claim 1, wherein the time window is a raised cosine window.

5. The transmission device according to claim 1, wherein the filter is a low-pass filter (LPF).

6. The transmission device according to claim 1, wherein the transmission symbol has a data part into which a cyclic prefix (CP) is inserted.

7. The transmission device according to claim 1, wherein the convolving the arbitrary filter into the arbitrary time window is performed and a result is stored in a look-up table used in the multiplying the transmission symbol by the time window.

8. A transmission method comprising:
inputting a transmission symbol; and
multiplying the transmission symbol by a time window,
wherein the time window is determined based on a result of convolving an arbitrary filter into an arbitrary time window.

9. The transmission method according to claim 8, wherein an orthogonal frequency division multiplexing (OFDM) is used as a modulation scheme.

10. The transmission method according to claim 8, wherein the time window is a rectangular window.

11. The transmission method according to claim 8, wherein the time window is a raised cosine window.

12. The transmission method according to claim 8, wherein the filter is a low-pass filter (LPF).

13. The transmission method according to claim 8, wherein the transmission symbol has a data part into which a cyclic prefix (CP) is inserted.

14. A non-transitory computer readable medium having stored thereon a program that when executed by a computer causes the computer to implement a transmission method comprising:
inputting a transmission symbol; and
multiplying the transmission symbol by a time window,
wherein the time window is determined based on a result of convolving an arbitrary filter into an arbitrary time window.

\* \* \* \* \*